United States Patent
Quam et al.

(10) Patent No.: US 10,488,062 B2
(45) Date of Patent: Nov. 26, 2019

(54) GEOFENCE PLUS SCHEDULE FOR A BUILDING CONTROLLER

(71) Applicant: Ademco Inc., Golden Valley, MN (US)

(72) Inventors: David Quam, Golden Valley, MN (US); Sara Slate, Austin, TX (US); Ted Booth, Morris Plains, NJ (US); Shannon Roberts, Austin, TX (US); Jason Tiefenauer, Round Rock, TX (US); Dan Tran, Morris Plains, NJ (US)

(73) Assignee: Ademco Inc., Golden Valley, MN (US)

( * ) Notice: Subject to any disclaimer, the term of this patent is extended or adjusted under 35 U.S.C. 154(b) by 27 days.

(21) Appl. No.: 15/217,795

(22) Filed: Jul. 22, 2016

(65) Prior Publication Data

US 2018/0023836 A1    Jan. 25, 2018

(51) Int. Cl.
| | | |
|---|---|---|
| F24F 11/30 | (2018.01) | |
| H04W 4/021 | (2018.01) | |
| F24F 120/10 | (2018.01) | |
| F24F 140/60 | (2018.01) | |
| F24F 120/12 | (2018.01) | |
| F24F 110/00 | (2018.01) | |
| F24F 120/20 | (2018.01) | |

(Continued)

(52) U.S. Cl.
CPC ............ F24F 11/30 (2018.01); H04W 4/021 (2013.01); *F24F 11/56* (2018.01); *F24F 11/61* (2018.01); *F24F 11/65* (2018.01); *F24F 2110/00* (2018.01); *F24F 2120/10* (2018.01); *F24F 2120/12* (2018.01); *F24F 2120/20* (2018.01); *F24F 2140/60* (2018.01)

(58) Field of Classification Search
CPC ........... F24F 11/0034; F24F 2011/0035; F24F 2011/0047; H04W 4/021
See application file for complete search history.

(56) References Cited

U.S. PATENT DOCUMENTS

| 1,522,169 A | 1/1925 | Young |
| 2,227,549 A | 1/1941 | McNeill |

(Continued)

FOREIGN PATENT DOCUMENTS

| AU | 2015201441 | 10/2015 |
| CN | 1976532 | 6/2007 |

(Continued)

OTHER PUBLICATIONS

Makwana, Divyang, "How to open desktop websites on mobile [Android Guide]", mobigyaan.com, Feb. 27, 2016 (accessed from <<https://www.mobigyaan.com/how-to-open-desktop-websites-on-mobile-android-guide>> on Jul. 21, 2018) (Year: 2016).*

(Continued)

*Primary Examiner* — Michael J Huntley
(74) *Attorney, Agent, or Firm* — Shumaker & Sieffert, P.A.

(57) ABSTRACT

A building control system that uses geofencing in conjunction with a time-based schedule when control one or more building systems. In one example, geofencing may be used to determine if the building is occupied or unoccupied. If the building is determined to be unoccupied via geofencing, the building controller may control to an unoccupied setpoint. If the building is determined to be occupied via geofencing, the HVAC controller may control in accordance with a time-based schedule.

19 Claims, 18 Drawing Sheets

(51) Int. Cl.
F24F 11/65 (2018.01)
F24F 11/56 (2018.01)
F24F 11/61 (2018.01)

(56) References Cited

U.S. PATENT DOCUMENTS

| | | |
|---|---|---|
| 2,462,162 A | 2/1949 | Christensen et al. |
| 2,839,670 A | 6/1958 | Gladstone |
| 2,854,610 A | 9/1958 | Waters et al. |
| 2,879,363 A | 3/1959 | Mucher |
| 2,961,625 A | 11/1960 | Sian |
| 2,980,875 A | 4/1961 | Sivacek |
| 3,087,134 A | 4/1963 | McOrlly |
| 3,147,457 A | 9/1964 | Gill et al. |
| 3,747,045 A | 7/1973 | Stross |
| 3,779,079 A | 12/1973 | Snook |
| 3,793,604 A | 2/1974 | Duggan et al. |
| 3,815,074 A | 6/1974 | Nagata |
| 3,818,213 A | 6/1974 | Rochford et al. |
| 3,832,668 A | 8/1974 | Berman |
| 3,868,620 A | 2/1975 | McBride, Jr. et al. |
| 3,884,363 A | 5/1975 | Ajlouny |
| 4,079,366 A | 3/1978 | Wong |
| 4,104,976 A | 8/1978 | Landau, Jr. et al. |
| 4,117,257 A | 9/1978 | Thomas |
| 4,174,807 A | 11/1979 | Smith et al. |
| 4,206,872 A | 6/1980 | Levine |
| 4,214,353 A | 7/1980 | Kalina |
| 4,216,384 A | 8/1980 | Hurley |
| 4,224,615 A | 9/1980 | Penz |
| 4,264,034 A | 4/1981 | Hyltin et al. |
| 4,276,536 A | 6/1981 | Wisnia |
| 4,296,334 A | 10/1981 | Wong |
| 4,298,946 A | 11/1981 | Hartsell et al. |
| 4,308,991 A | 1/1982 | Peinetti et al. |
| 4,317,102 A | 2/1982 | Vranas |
| 4,332,352 A | 6/1982 | Jaeger |
| 4,333,069 A | 6/1982 | Worth et al. |
| 4,337,822 A | 7/1982 | Hyltin et al. |
| 4,337,893 A | 7/1982 | Flanders et al. |
| 4,341,345 A | 7/1982 | Hammer et al. |
| 4,345,162 A | 8/1982 | Hammer et al. |
| 4,347,443 A | 8/1982 | Whitney |
| 4,373,664 A | 2/1983 | Barker et al. |
| 4,379,483 A | 4/1983 | Farley |
| 4,382,544 A | 5/1983 | Stewart |
| 4,386,649 A | 6/1983 | Hines et al. |
| 4,388,692 A | 6/1983 | Jones et al. |
| 4,431,134 A | 2/1984 | Hendricks et al. |
| 4,442,972 A | 4/1984 | Sahay et al. |
| 4,446,913 A | 5/1984 | Krocker |
| 4,479,604 A | 10/1984 | Didner |
| 4,498,650 A | 2/1985 | Smith et al. |
| 4,503,471 A | 3/1985 | Hanajima et al. |
| 4,506,827 A | 3/1985 | Jamieson et al. |
| 4,514,787 A | 4/1985 | Kaneko et al. |
| 4,556,169 A | 12/1985 | Zervos |
| 4,560,973 A | 12/1985 | Grimm et al. |
| 4,583,182 A | 4/1986 | Breddan |
| 4,585,164 A | 4/1986 | Butkovich et al. |
| 4,606,401 A | 8/1986 | Levine et al. |
| 4,621,336 A | 11/1986 | Brown |
| 4,622,544 A | 11/1986 | Bially et al. |
| 4,628,201 A | 12/1986 | Schmitt |
| 4,646,964 A | 3/1987 | Parker et al. |
| 4,685,025 A | 8/1987 | Carlomagno |
| 4,708,558 A | 11/1987 | Musil |
| 4,717,333 A | 1/1988 | Carignan |
| 4,725,001 A | 2/1988 | Carney et al. |
| 4,748,552 A | 5/1988 | Seino |
| 4,764,766 A | 8/1988 | Aoyama et al. |
| 4,797,568 A | 1/1989 | Gumbs |
| 4,808,841 A | 2/1989 | Ito et al. |
| 4,837,731 A | 6/1989 | Levine et al. |
| 4,839,636 A | 6/1989 | Zeiss |
| 4,881,686 A | 11/1989 | Mehta |
| 4,888,726 A | 12/1989 | Struger et al. |
| 4,899,129 A | 2/1990 | MacFadyen et al. |
| 4,912,463 A | 3/1990 | Li |
| 4,918,439 A | 4/1990 | Wozniak et al. |
| 4,941,829 A | 7/1990 | Estes et al. |
| 4,942,613 A | 7/1990 | Lynch |
| 4,948,040 A | 8/1990 | Kobayashi et al. |
| 4,969,508 A | 11/1990 | Tate et al. |
| 4,990,987 A | 2/1991 | Boucher et al. |
| 4,992,779 A | 2/1991 | Sugino et al. |
| 4,997,029 A | 3/1991 | Otsuka et al. |
| 5,005,365 A | 4/1991 | Lynch |
| 5,008,775 A | 4/1991 | Schindler et al. |
| 5,012,973 A | 5/1991 | Dick et al. |
| 5,036,698 A | 8/1991 | Conti |
| 5,038,851 A | 8/1991 | Meth |
| 5,043,531 A | 8/1991 | Gutenson et al. |
| 5,053,752 A | 10/1991 | Epstein et al. |
| 5,065,813 A | 11/1991 | Berkeley et al. |
| 5,086,385 A | 2/1992 | Launey et al. |
| 5,088,645 A | 2/1992 | Bell |
| 5,126,686 A | 6/1992 | Tam |
| 5,140,310 A | 8/1992 | DeLuca et al. |
| 5,149,200 A | 9/1992 | Shiokawa et al. |
| 5,161,606 A | 11/1992 | Berkeley et al. |
| 5,170,935 A | 12/1992 | Federspiel et al. |
| 5,172,565 A | 12/1992 | Wruck et al. |
| 5,181,653 A | 1/1993 | Foster et al. |
| 5,187,655 A | 2/1993 | Post et al. |
| 5,187,797 A | 2/1993 | Nielsen et al. |
| 5,213,417 A | 5/1993 | Yamada et al. |
| 5,218,399 A | 6/1993 | Izumi et al. |
| 5,218,552 A | 6/1993 | Stirk et al. |
| 5,226,723 A | 7/1993 | Chen |
| 5,230,482 A | 7/1993 | Ratz et al. |
| 5,237,305 A | 8/1993 | Ishikuro et al. |
| 5,238,184 A | 8/1993 | Adams |
| 5,239,745 A | 8/1993 | Hofsass |
| 5,251,813 A | 10/1993 | Kniepkamp |
| 5,259,445 A | 11/1993 | Pratt et al. |
| 5,270,915 A | 12/1993 | Tomita et al. |
| 5,271,410 A | 12/1993 | Wolzinger et al. |
| 5,272,477 A | 12/1993 | Tashima et al. |
| 5,289,362 A | 2/1994 | Liebl et al. |
| 5,291,063 A | 3/1994 | Adishian |
| 5,317,304 A | 5/1994 | Choi |
| 5,321,382 A | 6/1994 | Mizukoshi et al. |
| 5,329,991 A | 7/1994 | Metha et al. |
| 5,348,078 A | 9/1994 | Dushane et al. |
| 5,351,035 A | 9/1994 | Chrisco |
| 5,367,282 A | 11/1994 | Clem |
| 5,386,577 A | 1/1995 | Zenda |
| 5,390,206 A | 2/1995 | Rein et al. |
| 5,392,223 A | 2/1995 | Caci |
| 5,404,934 A | 4/1995 | Carlson et al. |
| 5,412,291 A | 5/1995 | Payne et al. |
| 5,414,618 A | 5/1995 | Mock et al. |
| 5,429,649 A | 7/1995 | Robin |
| 5,432,938 A | 7/1995 | Ohashi |
| 5,436,609 A | 7/1995 | Chan et al. |
| 5,442,340 A | 8/1995 | Dykema |
| 5,449,234 A | 9/1995 | Gipp et al. |
| 5,457,478 A | 10/1995 | Frank |
| 5,459,374 A | 10/1995 | Thoeny et al. |
| 5,479,155 A | 12/1995 | Zeinstra et al. |
| 5,482,209 A | 1/1996 | Cochran et al. |
| 5,495,887 A | 3/1996 | Kathnelson et al. |
| 5,506,572 A | 4/1996 | Hills et al. |
| 5,526,422 A | 6/1996 | Keen |
| 5,537,106 A | 7/1996 | Mitcuhashi |
| 5,539,633 A | 7/1996 | Hildebrand et al. |
| 5,544,036 A | 8/1996 | Brown, Jr. et al. |
| 5,565,843 A | 10/1996 | Meyvis |
| 5,566,879 A | 10/1996 | Longtin |
| 5,570,085 A | 10/1996 | Bertsch |
| 5,570,837 A | 11/1996 | Brown et al. |
| 5,572,438 A | 11/1996 | Ehlers et al. |
| 5,578,797 A | 11/1996 | Hewitt et al. |

(56) References Cited

U.S. PATENT DOCUMENTS

| | | |
|---|---|---|
| 5,590,831 A | 1/1997 | Manson et al. |
| 5,600,311 A | 2/1997 | Rice et al. |
| 5,603,451 A | 2/1997 | Helander et al. |
| 5,621,662 A | 4/1997 | Humphries et al. |
| 5,625,968 A | 5/1997 | Ashall |
| 5,654,813 A | 8/1997 | Whitworth |
| 5,668,535 A | 9/1997 | Hendiix et al. |
| 5,671,083 A | 9/1997 | Conner et al. |
| 5,673,850 A | 10/1997 | Uptegraph |
| 5,679,137 A | 10/1997 | Erdman et al. |
| 5,682,206 A | 10/1997 | Wehmeyer et al. |
| 5,684,710 A | 11/1997 | Ehlers et al. |
| 5,690,277 A | 11/1997 | Flood |
| 5,696,695 A | 12/1997 | Ehlers et al. |
| 5,711,785 A | 1/1998 | Maxwell |
| 5,722,126 A | 3/1998 | Reiter |
| 5,732,691 A | 3/1998 | Maiello et al. |
| 5,761,083 A | 6/1998 | Brown, Jr. et al. |
| 5,782,296 A | 7/1998 | Metha |
| 5,790,977 A | 8/1998 | Ezekiel |
| 5,810,908 A | 9/1998 | Gray et al. |
| 5,818,428 A | 10/1998 | Eisenbrandt et al. |
| 5,829,862 A | 11/1998 | Ferrell |
| 5,833,134 A | 11/1998 | Ho et al. |
| 5,838,226 A | 11/1998 | Houggy et al. |
| 5,838,563 A | 11/1998 | Dove et al. |
| 5,839,654 A | 11/1998 | Weber |
| 5,840,094 A | 11/1998 | Osendorf et al. |
| 5,842,032 A | 11/1998 | Bertsch |
| 5,862,737 A | 1/1999 | Chiu et al. |
| 5,873,519 A | 2/1999 | Beilfuss |
| 5,877,957 A | 3/1999 | Bennett |
| 5,884,248 A | 3/1999 | Hall |
| 5,886,697 A | 3/1999 | Naughton et al. |
| 5,901,183 A | 5/1999 | D' Souza |
| 5,902,183 A | 5/1999 | D' Souza |
| 5,903,327 A | 5/1999 | Hijii |
| 5,909,429 A | 6/1999 | Satyanarayana et al. |
| 5,915,473 A | 6/1999 | Ganesh et al. |
| 5,917,141 A | 6/1999 | Naquin, Jr. |
| 5,918,292 A | 6/1999 | Smith |
| 5,926,776 A | 7/1999 | Glorioso et al. |
| D413,328 S | 8/1999 | Kazama |
| 5,937,942 A | 8/1999 | Bias et al. |
| 5,938,757 A | 8/1999 | Bertsch |
| 5,940,296 A | 8/1999 | Meyer |
| 5,947,372 A | 9/1999 | Tiernan |
| 5,950,709 A | 9/1999 | Krueger et al. |
| 5,956,025 A | 9/1999 | Goulden et al. |
| 5,956,487 A | 9/1999 | Venkatraman et al. |
| 5,963,446 A | 10/1999 | Klein et al. |
| 5,963,886 A | 10/1999 | Candy et al. |
| 5,975,737 A | 11/1999 | Crater et al. |
| 5,982,362 A | 11/1999 | Crater et al. |
| 6,009,355 A | 12/1999 | Obradovich et al. |
| 6,013,121 A | 1/2000 | Chin et al. |
| 6,020,881 A | 2/2000 | Naughton et al. |
| 6,032,208 A | 2/2000 | Nixon et al. |
| 6,032,867 A | 3/2000 | Dushane et al. |
| D422,594 S | 4/2000 | Henderson et al. |
| 6,059,195 A | 5/2000 | Adams et al. |
| 6,061,603 A | 5/2000 | Papadopoulos et al. |
| 6,067,477 A | 5/2000 | Wewalaarachchi et al. |
| 6,081,197 A | 6/2000 | Garrick et al. |
| 6,084,523 A | 7/2000 | Gelnovatch et al. |
| 6,098,116 A | 8/2000 | Nixon et al. |
| 6,098,893 A | 8/2000 | Berglund et al. |
| 6,101,824 A | 8/2000 | Meyer et al. |
| 6,104,399 A | 8/2000 | Volkel |
| 6,104,963 A | 8/2000 | Cebasek et al. |
| 6,107,669 A | 8/2000 | Mokuya et al. |
| 6,112,127 A | 8/2000 | Bennett |
| 6,119,125 A | 9/2000 | Gloudeman et al. |
| 6,121,875 A | 9/2000 | Hamm et al. |
| 6,122,603 A | 9/2000 | Budike, Jr. |
| 6,134,771 A | 10/2000 | Nakamura et al. |
| 6,139,177 A | 10/2000 | Venkatraman et al. |
| 6,140,987 A | 10/2000 | Stein et al. |
| 6,141,595 A | 10/2000 | Gloudeman et al. |
| 6,145,751 A | 11/2000 | Ahmed et al. |
| 6,147,868 A | 11/2000 | Boutillier et al. |
| 6,149,065 A | 11/2000 | White et al. |
| 6,152,375 A | 11/2000 | Robison |
| 6,154,128 A | 11/2000 | Wookey et al. |
| 6,154,681 A | 11/2000 | Drees et al. |
| 6,157,943 A | 12/2000 | Meyer |
| 6,167,316 A | 12/2000 | Gloudeman et al. |
| 6,190,442 B1 | 2/2001 | Redner |
| 6,192,282 B1 | 2/2001 | Smith et al. |
| 6,196,467 B1 | 3/2001 | Dushane et al. |
| 6,208,331 B1 | 3/2001 | Singh et al. |
| 6,211,626 B1 | 4/2001 | Lys et al. |
| 6,211,782 B1 | 4/2001 | Sandelman et al. |
| 6,216,956 B1 | 4/2001 | Ehlers et al. |
| 6,236,326 B1 | 5/2001 | Murphy |
| 6,236,443 B1 | 5/2001 | Carlsen |
| 6,255,988 B1 | 7/2001 | Bischoff |
| 6,259,074 B1 | 7/2001 | Brunner et al. |
| 6,260,765 B1 | 7/2001 | Natale et al. |
| 6,282,454 B1 | 8/2001 | Papadopoulos et al. |
| 6,285,912 B1 | 9/2001 | Ellison et al. |
| 6,290,140 B1 | 9/2001 | Pesko et al. |
| D448,757 S | 10/2001 | Okubo |
| 6,311,105 B1 | 10/2001 | Budike, Jr. |
| 6,315,211 B1 | 11/2001 | Sartain et al. |
| 6,318,639 B1 | 11/2001 | Toth |
| 6,321,637 B1 | 11/2001 | Shanks et al. |
| 6,330,806 B1 | 12/2001 | Beaverson et al. |
| 6,334,107 B1 | 12/2001 | Gale et al. |
| 6,350,039 B1 | 2/2002 | Lee |
| 6,351,693 B1 | 2/2002 | Monie et al. |
| 6,344,861 B1 | 3/2002 | Naughton et al. |
| 6,353,853 B1 | 3/2002 | Gravlin |
| 6,356,282 B2 | 3/2002 | Roytman et al. |
| 6,366,198 B1 | 4/2002 | Allen et al. |
| 6,385,495 B1 | 5/2002 | Bennett |
| 6,385,510 B1 | 5/2002 | Hoog et al. |
| 6,394,359 B1 | 5/2002 | Morgan |
| 6,398,118 B1 | 6/2002 | Rosen et al. |
| 6,400,956 B1 | 6/2002 | Richton |
| 6,405,099 B1 | 6/2002 | Nagai et al. |
| 6,448,896 B1 | 9/2002 | Bankus et al. |
| 6,449,726 B1 | 9/2002 | Smith |
| 6,453,687 B2 | 9/2002 | Sharood et al. |
| D464,948 S | 10/2002 | Vasquez et al. |
| 6,460,774 B2 | 10/2002 | Sumida et al. |
| 6,462,654 B1 | 10/2002 | Sandelman et al. |
| 6,466,132 B1 | 10/2002 | Caronna et al. |
| 6,478,233 B1 | 11/2002 | Shah |
| 6,484,061 B2 | 11/2002 | Papadopoulos et al. |
| 6,486,874 B1 | 11/2002 | Muthuswamy et al. |
| 6,496,168 B1 | 12/2002 | Tomida |
| 6,502,758 B2 | 1/2003 | Cottrell |
| 6,507,282 B1 | 1/2003 | Sherwood |
| 6,508,171 B1 | 1/2003 | Georges |
| 6,518,953 B1 | 2/2003 | Armstrong |
| 6,518,957 B1 | 2/2003 | Lehtinen et al. |
| 6,519,509 B1 | 2/2003 | Nierlich et al. |
| 6,529,137 B1 | 3/2003 | Roe |
| 6,546,419 B1 | 4/2003 | Humpleman et al. |
| 6,556,899 B1 | 4/2003 | Harvey et al. |
| 6,574,537 B2 | 6/2003 | Kipersztok et al. |
| 6,574,581 B1 | 6/2003 | Bohrer et al. |
| 6,578,770 B1 | 6/2003 | Rosen |
| 6,580,950 B1 | 6/2003 | Johnson et al. |
| 6,581,846 B1 | 6/2003 | Rosen |
| 6,588,931 B2 | 7/2003 | Betzner et al. |
| 6,595,430 B1 | 7/2003 | Shah |
| 6,596,059 B1 | 7/2003 | Greist et al. |
| 6,597,151 B1 | 7/2003 | Price et al. |
| 6,598,056 B1 | 7/2003 | Hull et al. |
| D478,051 S | 8/2003 | Sagawa |
| 6,604,023 B1 | 8/2003 | Brown et al. |
| 6,608,560 B2 | 8/2003 | Abrams |

(56) References Cited

U.S. PATENT DOCUMENTS

| | | |
|---|---|---|
| 6,619,555 B2 | 9/2003 | Rosen |
| 6,621,507 B1 | 9/2003 | Shah |
| 6,639,614 B1 | 10/2003 | Kosslyn et al. |
| 6,640,141 B2 | 10/2003 | Bennett |
| 6,640,145 B2 | 10/2003 | Hoffberg et al. |
| 6,643,567 B2 | 11/2003 | Kolk et al. |
| 6,650,322 B2 | 11/2003 | Dai et al. |
| 6,663,010 B2 | 12/2003 | Chene et al. |
| 6,665,613 B2 | 12/2003 | Duvall |
| 6,671,586 B2 | 12/2003 | Davis et al. |
| 6,675,193 B1 | 1/2004 | Slavin et al. |
| 6,685,098 B2 | 2/2004 | Okano et al. |
| 6,717,513 B1 | 4/2004 | Sandelman et al. |
| 6,721,607 B2 | 4/2004 | Brault |
| 6,726,112 B1 | 4/2004 | Ho |
| D492,282 S | 6/2004 | Lachello et al. |
| 6,681,154 B2 | 6/2004 | Nierlich et al. |
| 6,756,998 B1 | 6/2004 | Bilger |
| 6,783,079 B2 | 8/2004 | Carey et al. |
| 6,786,421 B2 | 9/2004 | Rosen |
| 6,789,739 B2 | 9/2004 | Rosen |
| 6,801,849 B2 | 10/2004 | Szukala et al. |
| 6,810,307 B1 | 10/2004 | Addy |
| 6,810,397 B1 | 10/2004 | Oian et al. |
| 6,824,069 B2 | 11/2004 | Rosen |
| 6,833,990 B2 | 12/2004 | LaCroix et al. |
| 6,842,650 B2 | 1/2005 | Bennett |
| 6,842,721 B2 | 1/2005 | Kim et al. |
| 6,851,621 B1 | 2/2005 | Wacker et al. |
| 6,862,498 B2 | 3/2005 | Davis et al. |
| 6,868,293 B1 | 3/2005 | Schurr et al. |
| 6,868,538 B1 | 3/2005 | Nixon et al. |
| 6,904,385 B1 | 6/2005 | Budike, Jr. |
| 6,909,891 B2 | 6/2005 | Yamashita et al. |
| 6,912,429 B1 | 6/2005 | Bilger |
| 6,917,373 B2 | 7/2005 | Vong et al. |
| 6,931,445 B2 | 8/2005 | Davis |
| 6,961,763 B1 | 11/2005 | Wang et al. |
| D512,208 S | 12/2005 | Kubo et al. |
| 6,973,410 B2 | 12/2005 | Seigel |
| 6,975,958 B2 | 12/2005 | Bohrer et al. |
| 6,988,070 B2 | 1/2006 | Kawasaki et al. |
| 6,988,671 B2 | 1/2006 | Deluca |
| 6,990,335 B1 | 1/2006 | Shamoon et al. |
| 7,000,849 B2 | 2/2006 | Ashworth et al. |
| 7,001,495 B2 | 2/2006 | Essalik et al. |
| 7,009,493 B2 | 3/2006 | Howard et al. |
| 7,010,363 B2 | 3/2006 | Donnelly et al. |
| 7,027,878 B2 | 4/2006 | Bennett |
| 7,028,912 B1 | 4/2006 | Rosen |
| D520,989 S | 5/2006 | Miller |
| 7,050,026 B1 | 5/2006 | Rosen |
| 7,055,759 B2 | 6/2006 | Wacker et al. |
| 7,080,358 B2 | 7/2006 | Kuzmin |
| 7,080,941 B1 | 7/2006 | Benjamin et al. |
| 7,083,109 B2 | 8/2006 | Pouchak |
| 7,083,189 B2 | 8/2006 | Ogata |
| 7,089,088 B2 | 8/2006 | Terry et al. |
| 7,108,194 B1 | 9/2006 | Hankins, II |
| 7,127,734 B1 | 10/2006 | Amit |
| 7,130,719 B2 | 10/2006 | Ehlers et al. |
| 7,130,720 B2 | 10/2006 | Fisher |
| D531,588 S | 11/2006 | Peh |
| D533,515 S | 12/2006 | Klein et al. |
| 7,146,253 B2 | 12/2006 | Hoog et al. |
| 7,152,058 B2 | 12/2006 | Shotton et al. |
| 7,152,806 B1 | 12/2006 | Rosen |
| 7,155,305 B2 | 12/2006 | Hayes et al. |
| D535,573 S | 1/2007 | Barton et al. |
| 7,156,318 B1 | 1/2007 | Rosen |
| 7,159,789 B2 | 1/2007 | Schwendinger et al. |
| 7,163,156 B2 | 1/2007 | Kates |
| 7,184,861 B2 | 2/2007 | Petite |
| 7,188,002 B2 | 3/2007 | Chapman, Jr. et al. |
| 7,193,498 B2 | 3/2007 | Kawamoto et al. |
| D542,236 S | 5/2007 | Klein et al. |
| 7,212,887 B2 | 5/2007 | Shah et al. |
| 7,221,984 B2 | 5/2007 | Bennett |
| 7,222,800 B2 | 5/2007 | Wruck |
| 7,225,054 B2 | 5/2007 | Amundson et al. |
| 7,231,605 B1 | 6/2007 | Ramakesavan |
| 7,232,075 B2 | 6/2007 | Rosen |
| 7,240,289 B2 | 7/2007 | Naughton et al. |
| 7,257,397 B2 | 8/2007 | Shamoon et al. |
| 7,261,762 B2 | 8/2007 | Kang et al. |
| 7,266,777 B2 | 9/2007 | Scott et al. |
| 7,272,403 B2 | 9/2007 | Creamer et al. |
| 7,274,973 B2 | 9/2007 | Nichols et al. |
| 7,279,659 B2 | 10/2007 | Gagas et al. |
| 7,298,833 B2 | 11/2007 | Klein et al. |
| 7,302,642 B2 | 11/2007 | Smith et al. |
| 7,327,250 B2 | 2/2008 | Harvey |
| 7,331,187 B2 | 2/2008 | Kates |
| 7,333,460 B2 | 2/2008 | Vaisanen et al. |
| 7,341,201 B2 | 3/2008 | Stanimirovic |
| 7,343,226 B2 | 3/2008 | Ehlers et al. |
| 7,354,005 B2 | 4/2008 | Carey et al. |
| 7,364,093 B2 | 4/2008 | Garozzo |
| 7,374,327 B2 | 5/2008 | Schexnaider |
| 7,385,500 B2 | 6/2008 | Irwin |
| RE40,437 E | 7/2008 | Rosen |
| 7,403,838 B2 | 7/2008 | Deen et al. |
| 7,406,353 B2 | 7/2008 | Bennett |
| 7,411,489 B1 | 8/2008 | Elwell et al. |
| 7,416,332 B2 | 8/2008 | Rountree et al. |
| 7,419,532 B2 | 9/2008 | Sellers et al. |
| 7,434,742 B2 | 10/2008 | Mueller et al. |
| 7,435,278 B2 | 10/2008 | Terlson |
| D580,801 S | 11/2008 | Takach et al. |
| 7,451,017 B2 | 11/2008 | McNally |
| 7,451,606 B2 | 11/2008 | Harrod |
| 7,452,396 B2 | 11/2008 | Terlson et al. |
| 7,454,269 B1 | 11/2008 | Dushane et al. |
| 7,469,151 B2 | 12/2008 | Khan et al. |
| 7,496,627 B2 | 2/2009 | Moorer et al. |
| 7,500,780 B2 | 3/2009 | Miki et al. |
| 7,505,914 B2 | 3/2009 | McCall |
| 7,510,126 B2 | 3/2009 | Rossi et al. |
| 7,542,867 B2 | 6/2009 | Steger et al. |
| 7,551,071 B2 | 6/2009 | Bennett, III et al. |
| 7,556,207 B2 | 7/2009 | Mueller et al. |
| 7,565,225 B2 | 7/2009 | Dushane et al. |
| 7,571,865 B2 | 8/2009 | Nicodem et al. |
| 7,574,208 B2 | 8/2009 | Hanson et al. |
| 7,578,135 B2 | 8/2009 | Mattheis |
| 7,594,960 B2 | 9/2009 | Johansson |
| 7,604,046 B2 | 10/2009 | Bergman et al. |
| 7,614,567 B2 | 11/2009 | Chapman et al. |
| 7,617,691 B2 | 11/2009 | Street et al. |
| 7,636,604 B2 | 12/2009 | Bergman et al. |
| 7,644,591 B2 | 1/2010 | Singh et al. |
| 7,665,019 B2 | 2/2010 | Jaeger |
| 7,668,532 B2 | 2/2010 | Shamoon et al. |
| 7,676,282 B2 | 3/2010 | Bosley |
| 7,703,694 B2 | 4/2010 | Mueller et al. |
| 7,707,189 B2 | 4/2010 | Haselden et al. |
| 7,713,339 B2 | 5/2010 | Johansson |
| 7,739,282 B1 | 6/2010 | Smith et al. |
| 7,768,393 B2 | 8/2010 | Nigam |
| 7,770,242 B2 | 8/2010 | Sell |
| 7,778,734 B2 | 8/2010 | Oswald et al. |
| 7,793,056 B2 | 9/2010 | Boggs et al. |
| 7,801,646 B2 | 9/2010 | Amundson et al. |
| 7,812,274 B2 | 10/2010 | Dupont et al. |
| 7,814,516 B2 | 10/2010 | Stecyk et al. |
| 7,827,495 B2 | 11/2010 | Bells et al. |
| 7,865,252 B2 | 1/2011 | Clayton |
| 7,904,209 B2 | 3/2011 | Podgorny et al. |
| 7,908,211 B1 | 3/2011 | Chen et al. |
| 7,940,907 B2 | 5/2011 | Bennett, III et al. |
| 7,941,431 B2 | 5/2011 | Bluhm et al. |
| 7,949,615 B2 | 5/2011 | Ehlers et al. |
| 7,953,518 B2 | 5/2011 | Kansal et al. |
| 7,954,726 B2 | 6/2011 | Siddaramanna et al. |

(56) References Cited

U.S. PATENT DOCUMENTS

| | | |
|---|---|---|
| 7,963,454 B2 | 6/2011 | Sullivan et al. |
| 7,973,678 B2 | 7/2011 | Petricoin, Jr. et al. |
| 7,984,220 B2 | 7/2011 | Gerard et al. |
| 8,010,237 B2 | 8/2011 | Cheung et al. |
| 8,018,329 B2 | 9/2011 | Morgan et al. |
| 8,019,567 B2 | 9/2011 | Steinberg et al. |
| 8,024,073 B2 | 9/2011 | Imes et al. |
| 8,032,254 B2 | 10/2011 | Amundson et al. |
| 8,063,775 B2 | 11/2011 | Reed et al. |
| 8,064,935 B2 | 11/2011 | Shamoon et al. |
| 8,065,342 B1 | 11/2011 | Borg et al. |
| 8,087,593 B2 | 1/2012 | Leen |
| 8,091,794 B2 | 1/2012 | Siddaramanna et al. |
| 8,091,796 B2 | 1/2012 | Amundson et al. |
| 8,095,340 B2 | 1/2012 | Brown |
| 8,099,195 B2 | 1/2012 | Imes et al. |
| 8,108,076 B2 | 1/2012 | Imes et al. |
| 8,115,656 B2 | 2/2012 | Bevacqua et al. |
| 8,125,332 B2 | 2/2012 | Curran et al. |
| 8,126,685 B2 | 2/2012 | Nasle |
| 8,126,999 B2 | 2/2012 | Bahl et al. |
| 8,131,401 B2 | 3/2012 | Nasle |
| 8,131,506 B2 | 3/2012 | Steinberg et al. |
| 8,135,413 B2 | 3/2012 | Dupray |
| 8,140,279 B2 | 3/2012 | Subbloie |
| 8,150,421 B2 | 4/2012 | Ward |
| 8,151,234 B2 | 4/2012 | Berkens et al. |
| 8,167,216 B2 | 5/2012 | Schultz et al. |
| 8,180,492 B2 | 5/2012 | Steinberg |
| 8,195,309 B2 | 6/2012 | Hegde et al. |
| 8,195,313 B1 | 6/2012 | Fadell et al. |
| 8,196,064 B2 | 6/2012 | Krzyzanowski et al. |
| 8,199,113 B2 | 6/2012 | Madonna et al. |
| 8,202,161 B2 | 6/2012 | Leake et al. |
| 8,205,244 B2 | 6/2012 | Nightingale et al. |
| 8,206,032 B2 | 6/2012 | Wakabayashi |
| 8,219,219 B2 | 7/2012 | Bennett |
| 8,229,722 B2 | 7/2012 | Nasle |
| 8,232,877 B2 | 7/2012 | Husain |
| 8,239,066 B2 | 8/2012 | Jennings et al. |
| 8,246,246 B2 | 8/2012 | Wakabayashi |
| 8,255,090 B2 | 8/2012 | Frader-Thompson et al. |
| 8,258,654 B2 | 9/2012 | Parsons |
| 8,269,620 B2 | 9/2012 | Bullemer et al. |
| 8,280,536 B1 | 10/2012 | Fadell et al. |
| 8,301,123 B2 | 10/2012 | Roundtree et al. |
| 8,301,765 B2 | 10/2012 | Goodman |
| 8,332,055 B2 | 12/2012 | Veillette |
| 8,334,906 B2 | 12/2012 | Lipton et al. |
| 8,337,081 B1 | 12/2012 | Holmberg et al. |
| 8,350,697 B2 | 1/2013 | Trundle et al. |
| 8,386,082 B2 | 2/2013 | Oswald |
| 8,390,473 B2 | 3/2013 | Kryzanowski et al. |
| 8,396,455 B2 | 3/2013 | Carlson et al. |
| 8,397,411 B2 | 3/2013 | Russo et al. |
| 8,406,162 B2 | 3/2013 | Haupt et al. |
| 8,412,381 B2 | 4/2013 | Nikovski et al. |
| 8,412,654 B2 | 4/2013 | Montovo |
| 8,423,322 B2 | 4/2013 | Steinberg et al. |
| 8,427,278 B2 | 4/2013 | Petricoin, Jr. |
| 8,428,867 B2 | 4/2013 | Ashley, Jr. et al. |
| 8,429,188 B2 | 4/2013 | Aravamudan et al. |
| 8,433,344 B1 | 4/2013 | Virga |
| 8,442,695 B2 | 5/2013 | Imes et al. |
| 8,457,797 B2 | 6/2013 | Imes et al. |
| 8,491,159 B2 | 7/2013 | Recker et al. |
| 8,509,954 B2 | 8/2013 | Imes et al. |
| 8,510,421 B2 | 8/2013 | Matsuzaki et al. |
| 8,523,084 B2 | 9/2013 | Siddaramanna et al. |
| 8,531,294 B2 | 9/2013 | Slavin et al. |
| 8,554,374 B2 | 10/2013 | Lunacek et al. |
| 8,554,714 B2 | 10/2013 | Raymond et al. |
| 8,571,518 B2 | 10/2013 | Imes et al. |
| 8,577,392 B1 | 11/2013 | Raghunandan et al. |
| 8,583,566 B2 | 11/2013 | Aravamudan et al. |
| 8,587,445 B2 | 11/2013 | Rockwell |
| 8,626,344 B2 | 1/2014 | Imes et al. |
| 8,630,741 B1 | 1/2014 | Matsuoka et al. |
| 8,634,796 B2 | 1/2014 | Johnson |
| 8,648,706 B2 | 2/2014 | Ranjun et al. |
| 8,659,302 B1 | 2/2014 | Warren et al. |
| 8,666,558 B2 | 3/2014 | Wang et al. |
| 8,670,783 B2 | 3/2014 | Klein |
| 8,686,841 B2 | 4/2014 | Macheca et al. |
| 8,798,804 B2 | 8/2014 | Besore et al. |
| 8,810,454 B2 | 8/2014 | Cosman |
| 8,812,024 B2 | 8/2014 | Obermeyer et al. |
| 8,812,027 B2 | 8/2014 | Obermeyer et al. |
| 8,829,799 B2 | 9/2014 | Recker et al. |
| 8,840,033 B2 | 9/2014 | Steinberg |
| 8,874,129 B2 | 10/2014 | Forutanpour et al. |
| 8,886,178 B2 | 11/2014 | Chatterjee |
| 8,890,675 B2 | 11/2014 | Ranjan et al. |
| 8,909,256 B2 | 12/2014 | Fraccaroli |
| 8,918,219 B2 | 12/2014 | Sloo et al. |
| 8,941,489 B2 | 1/2015 | Sheshadri et al. |
| 8,949,231 B2 | 2/2015 | Aravamudan et al. |
| 8,965,401 B2 | 2/2015 | Sheshadri et al. |
| 8,965,406 B2 | 2/2015 | Henderson |
| 8,976,025 B2 | 3/2015 | Somasundaram et al. |
| 9,019,111 B1 | 4/2015 | Sloo et al. |
| 9,026,261 B2 | 5/2015 | Bukhin et al. |
| 9,033,255 B2 | 5/2015 | Tessier et al. |
| 9,055,475 B2 | 6/2015 | Lacatus et al. |
| 9,065,928 B2 | 6/2015 | Huang et al. |
| 9,071,453 B2 | 6/2015 | Shoemaker et al. |
| 9,113,298 B2 | 8/2015 | Qiu |
| 9,115,656 B2 | 8/2015 | Kosaka et al. |
| 9,134,715 B2 | 9/2015 | Geadelmann et al. |
| 9,167,381 B2 | 10/2015 | McDonald et al. |
| 9,168,927 B2 | 10/2015 | Louboutin |
| 9,183,530 B2 | 11/2015 | Schwarz et al. |
| 9,210,545 B2 | 12/2015 | Sabatelli et al. |
| 9,215,560 B1 | 12/2015 | Jernigan |
| 9,219,983 B2 | 12/2015 | Sheshadri et al. |
| 9,247,378 B2 | 1/2016 | Bisson et al. |
| 9,288,620 B2 | 3/2016 | Menendez |
| 9,307,344 B2 | 4/2016 | Rucker et al. |
| 9,311,685 B2 | 4/2016 | Harkey et al. |
| 9,313,320 B2 | 4/2016 | Zeilingold et al. |
| 9,316,456 B1 | 4/2016 | Oliver |
| 9,363,772 B2 | 6/2016 | Burks |
| 9,414,422 B2 | 8/2016 | Belghoul et al. |
| 9,433,681 B2 | 9/2016 | Constien et al. |
| 9,449,491 B2 | 9/2016 | Sager et al. |
| 9,587,848 B2 | 3/2017 | Adamik et al. |
| 9,709,295 B2 | 7/2017 | Adamik et al. |
| 10,177,930 B1 * | 1/2019 | Bodkin ............ H04L 12/2803 |
| 2001/0010032 A1 | 7/2001 | Ehlers et al. |
| 2001/0025349 A1 | 9/2001 | Sharood et al. |
| 2001/0029585 A1 | 10/2001 | Simon et al. |
| 2001/0038999 A1 | 11/2001 | Hainey, II |
| 2001/0042684 A1 | 11/2001 | Essalik et al. |
| 2001/0052459 A1 | 12/2001 | Essalik et al. |
| 2002/0005435 A1 | 1/2002 | Cottrell |
| 2002/0011923 A1 | 1/2002 | Cunningham et al. |
| 2002/0022991 A1 | 2/2002 | Sharood et al. |
| 2002/0033753 A1 | 3/2002 | Imbo |
| 2002/0060701 A1 | 5/2002 | Naughton et al. |
| 2002/0073254 A1 | 6/2002 | Bertsch |
| 2002/0082746 A1 | 6/2002 | Schubring et al. |
| 2002/0092779 A1 | 7/2002 | Essalik et al. |
| 2002/0096572 A1 | 7/2002 | Chene et al. |
| 2002/0138184 A1 | 9/2002 | Kipersztok et al. |
| 2002/0147006 A1 | 10/2002 | Coon et al. |
| 2002/0171624 A1 | 11/2002 | Stecyk et al. |
| 2002/0173929 A1 | 11/2002 | Seigel |
| 2003/0000692 A1 | 1/2003 | Takaski et al. |
| 2003/0014179 A1 | 1/2003 | Szukala et al. |
| 2003/0033156 A1 | 2/2003 | McCall |
| 2003/0033230 A1 | 2/2003 | McCall |
| 2003/0034897 A1 | 2/2003 | Shamoon et al. |
| 2003/0034898 A1 | 2/2003 | Shamoon et al. |
| 2003/0070544 A1 | 4/2003 | Mulvaney et al. |

(56) References Cited

U.S. PATENT DOCUMENTS

| | | |
|---|---|---|
| 2003/0074088 A1 | 4/2003 | Gonzales et al. |
| 2003/0074489 A1 | 4/2003 | Steger et al. |
| 2003/0079387 A1 | 5/2003 | Derose |
| 2003/0103075 A1 | 6/2003 | Rosselot |
| 2003/0121652 A1 | 7/2003 | Carey et al. |
| 2003/0123224 A1 | 7/2003 | LaCroix et al. |
| 2003/0136135 A1 | 7/2003 | Kim et al. |
| 2003/0142121 A1 | 7/2003 | Rosen |
| 2003/0150926 A1 | 8/2003 | Rosen |
| 2003/0150927 A1 | 8/2003 | Rosen |
| 2003/0177012 A1 | 9/2003 | Drennen |
| 2003/0178070 A1 | 9/2003 | Glicken |
| 2004/0034484 A1 | 2/2004 | Solomita |
| 2004/0193324 A1 | 3/2004 | Hoog et al. |
| 2004/0074978 A1 | 4/2004 | Rosen |
| 2004/0133314 A1 | 7/2004 | Ehlers et al. |
| 2004/0245352 A1 | 12/2004 | Smith |
| 2004/0262410 A1 | 12/2004 | Hull |
| 2005/0083168 A1 | 4/2005 | Beitenbach |
| 2005/0090915 A1 | 4/2005 | Geiwitz |
| 2005/0096753 A1 | 5/2005 | Arling et al. |
| 2005/0162282 A1 | 7/2005 | Dresti et al. |
| 2005/0172056 A1 | 8/2005 | Ahn |
| 2005/0194456 A1 | 9/2005 | Tessier et al. |
| 2005/0219860 A1 | 10/2005 | Schexnaider |
| 2005/0270151 A1 | 12/2005 | Winick |
| 2006/0000919 A1 | 1/2006 | Schwendinger et al. |
| 2006/0032379 A1 | 2/2006 | Kates |
| 2006/0049694 A1 | 3/2006 | Kates |
| 2006/0063522 A1 | 3/2006 | McFarland |
| 2006/0071086 A1 | 4/2006 | Kates |
| 2006/0072726 A1 | 4/2006 | Klein et al. |
| 2006/0097063 A1 | 5/2006 | Zeevi |
| 2006/0103549 A1 | 5/2006 | Hunt et al. |
| 2006/0132458 A1 | 6/2006 | Garfio et al. |
| 2006/0168342 A1 | 7/2006 | Budde et al. |
| 2006/0186213 A1 | 8/2006 | Carey et al. |
| 2006/0196953 A1 | 9/2006 | Simon et al. |
| 2006/0219799 A1 | 10/2006 | Schultz et al. |
| 2006/0242591 A1 | 10/2006 | Van Dok et al. |
| 2006/0250578 A1 | 11/2006 | Pohl et al. |
| 2006/0271214 A1 | 11/2006 | Brown |
| 2006/0283697 A1 | 12/2006 | Garfio |
| 2007/0013534 A1 | 1/2007 | DiMaggio |
| 2007/0029397 A1 | 2/2007 | Mueller et al. |
| 2007/0037605 A1 | 2/2007 | Logan |
| 2007/0043477 A1 | 2/2007 | Ehlers et al. |
| 2007/0043478 A1 | 2/2007 | Ehlers |
| 2007/0045429 A1 | 3/2007 | Chapman, Jr. et al. |
| 2007/0045431 A1 | 3/2007 | Chapman, Jr. et al. |
| 2007/0060171 A1 | 3/2007 | Sudit et al. |
| 2007/0061050 A1 | 3/2007 | Hoffknecht |
| 2007/0099626 A1 | 5/2007 | Lawrence et al. |
| 2007/0114293 A1 | 5/2007 | Gugenheim |
| 2007/0114295 A1 | 5/2007 | Jenkins |
| 2007/0121334 A1 | 5/2007 | Bourdin et al. |
| 2007/0122789 A1 | 5/2007 | Yoo |
| 2007/0129083 A1 | 6/2007 | Creamer et al. |
| 2007/0146126 A1 | 6/2007 | Wang |
| 2007/0138496 A1 | 7/2007 | Zhao et al. |
| 2007/0225866 A1 | 9/2007 | Moorer et al. |
| 2007/0233323 A1 | 10/2007 | Wiemeyer et al. |
| 2007/0249319 A1 | 10/2007 | Faulkner et al. |
| 2007/0250189 A1 | 10/2007 | Rourke et al. |
| 2007/0277061 A1 | 11/2007 | Ashe |
| 2007/0278320 A1 | 12/2007 | Lunacek et al. |
| 2007/0289731 A1 | 12/2007 | Deligiannis et al. |
| 2008/0015740 A1 | 1/2008 | Osann, Jr. |
| 2008/0083234 A1 | 4/2008 | Krebs et al. |
| 2008/0093460 A1 | 4/2008 | Frantz et al. |
| 2008/0094230 A1 | 4/2008 | Mock et al. |
| 2008/0120578 A1 | 5/2008 | Wang et al. |
| 2008/0219319 A1 | 9/2008 | Buckalew |
| 2008/0262820 A1 | 10/2008 | Nasle |
| 2008/0281472 A1 | 11/2008 | Podgorny et al. |
| 2008/0283621 A1 | 11/2008 | Quirino et al. |
| 2009/0012704 A1 | 1/2009 | Franco |
| 2009/0020307 A1 | 1/2009 | Roach, Jr. |
| 2009/0052859 A1 | 2/2009 | Greenberger et al. |
| 2009/0065596 A1* | 3/2009 | Seem ................... F24F 11/0009 236/51 |
| 2009/0093234 A1 | 4/2009 | Cai et al. |
| 2009/0140056 A1 | 6/2009 | Leen |
| 2009/0140060 A1 | 6/2009 | Stoner et al. |
| 2009/0140062 A1 | 6/2009 | Amundson et al. |
| 2009/0143879 A1 | 6/2009 | Amundsom et al. |
| 2009/0143880 A1 | 6/2009 | Amundson et al. |
| 2009/0143916 A1 | 6/2009 | Boll et al. |
| 2009/0143918 A1 | 6/2009 | Amundson et al. |
| 2009/0165644 A1 | 7/2009 | Campbell |
| 2009/0187499 A1 | 7/2009 | Mulder et al. |
| 2009/0199212 A1 | 8/2009 | Schneider |
| 2009/0240381 A1 | 9/2009 | Lane |
| 2009/0302994 A1 | 12/2009 | Rhee et al. |
| 2010/0008422 A1 | 1/2010 | Shimizu et al. |
| 2010/0014277 A1 | 1/2010 | Delany |
| 2010/0212198 A1 | 1/2010 | Matsunaga et al. |
| 2010/0216465 A1 | 1/2010 | Mubarek et al. |
| 2010/0026479 A1 | 2/2010 | Tran |
| 2010/0034386 A1 | 2/2010 | Choong et al. |
| 2010/0042940 A1 | 2/2010 | Monday et al. |
| 2010/0081375 A1 | 4/2010 | Rosenblatt et al. |
| 2010/0084482 A1 | 4/2010 | Kennedy et al. |
| 2010/0107112 A1 | 4/2010 | Jennings et al. |
| 2010/0127854 A1 | 5/2010 | Helvick et al. |
| 2010/0131880 A1 | 5/2010 | Lee et al. |
| 2010/0146071 A1 | 6/2010 | Comerford et al. |
| 2010/0156628 A1 | 6/2010 | Ainsbury et al. |
| 2010/0161574 A1 | 6/2010 | Davidson et al. |
| 2010/0161706 A1 | 6/2010 | Kim et al. |
| 2010/0179991 A1 | 7/2010 | Lorch et al. |
| 2010/0197238 A1 | 8/2010 | Pathuri et al. |
| 2010/0204834 A1 | 8/2010 | Comerford et al. |
| 2010/0256823 A1 | 10/2010 | Cherukuri et al. |
| 2010/0261465 A1 | 10/2010 | Rhoads et al. |
| 2010/0280667 A1 | 11/2010 | Steinberg |
| 2010/0289644 A1 | 11/2010 | Slavin et al. |
| 2010/0304730 A1 | 12/2010 | Huang et al. |
| 2011/0012433 A1 | 1/2011 | Parsons |
| 2011/0015797 A1 | 1/2011 | Gilstrap |
| 2011/0061527 A1 | 3/2011 | Sullivan |
| 2011/0078515 A1 | 3/2011 | Yasukawa |
| 2011/0093424 A1 | 4/2011 | Zimmermann et al. |
| 2011/0153525 A1 | 6/2011 | Benco et al. |
| 2011/0190910 A1 | 8/2011 | Lombard et al. |
| 2011/0202185 A1* | 8/2011 | Imes ..................... F24F 11/006 700/277 |
| 2011/0210862 A1 | 9/2011 | Cumeralto et al. |
| 2011/0225859 A1 | 9/2011 | Safavi |
| 2011/0231020 A1 | 9/2011 | Ramachandran et al. |
| 2011/0256881 A1* | 10/2011 | Huang ................... G01S 5/0257 455/456.1 |
| 2011/0271185 A1 | 11/2011 | Chen et al. |
| 2011/0290893 A1* | 12/2011 | Steinberg ............. F24F 11/0034 236/49.3 |
| 2011/0306304 A1 | 12/2011 | Forutanpour et al. |
| 2012/0005590 A1 | 1/2012 | Lombard et al. |
| 2012/0053739 A1 | 3/2012 | Brian et al. |
| 2012/0065783 A1 | 3/2012 | Fadell et al. |
| 2012/0066168 A1 | 3/2012 | Fadell et al. |
| 2012/0078425 A1 | 3/2012 | Gardenswartz |
| 2012/0086578 A1 | 4/2012 | Moss et al. |
| 2012/0095749 A1 | 4/2012 | Capretta |
| 2012/0130547 A1 | 5/2012 | Fadell et al. |
| 2012/0131504 A1 | 5/2012 | Fadell et al. |
| 2012/0172027 A1 | 7/2012 | Partheesh et al. |
| 2012/0191257 A1 | 7/2012 | Corcoran et al. |
| 2012/0209730 A1 | 8/2012 | Garrett |
| 2012/0239221 A1 | 9/2012 | Mighdoll et al. |
| 2012/0247187 A1 | 10/2012 | Herz |
| 2012/0259466 A1 | 10/2012 | Ray et al. |
| 2012/0284769 A1 | 11/2012 | Dixon et al. |
| 2012/0307298 A1 | 12/2012 | Ishige et al. |
| 2012/0318073 A1 | 12/2012 | Zavodny et al. |

(56) References Cited

U.S. PATENT DOCUMENTS

| | | |
|---|---|---|
| 2012/0318135 A1 | 12/2012 | Hoglund et al. |
| 2012/0318137 A1 | 12/2012 | Ragland et al. |
| 2012/0318138 A1 | 12/2012 | Bisson et al. |
| 2012/0319851 A1 | 12/2012 | Hoglund et al. |
| 2012/0323374 A1 | 12/2012 | Dean-Hendricks et al. |
| 2012/0323375 A1 | 12/2012 | Dean-Hendricks et al. |
| 2012/0323377 A1 | 12/2012 | Hoglund et al. |
| 2013/0024799 A1 | 1/2013 | Fadell et al. |
| 2013/0027412 A1* | 1/2013 | Roddy .............. G04C 23/345 345/501 |
| 2013/0045760 A1 | 2/2013 | Obermeyer et al. |
| 2013/0054863 A1 | 2/2013 | Imes et al. |
| 2013/0061085 A1 | 3/2013 | Raja Rao |
| 2013/0073094 A1 | 3/2013 | Knapton et al. |
| 2013/0090767 A1 | 4/2013 | Bruck et al. |
| 2013/0099009 A1 | 4/2013 | Filson et al. |
| 2013/0099010 A1 | 4/2013 | Filson et al. |
| 2013/0158714 A1 | 6/2013 | Barton et al. |
| 2013/0158715 A1 | 6/2013 | Barton et al. |
| 2013/0158717 A1 | 6/2013 | Zywicki et al. |
| 2013/0158718 A1 | 6/2013 | Barton et al. |
| 2013/0158720 A1 | 6/2013 | Zywicki et al. |
| 2013/0184874 A1 | 7/2013 | Frader-Thompson et al. |
| 2013/0204441 A1 | 8/2013 | Sloo et al. |
| 2013/0225196 A1 | 8/2013 | James et al. |
| 2013/0227126 A1 | 8/2013 | Imes et al. |
| 2013/0231137 A1 | 9/2013 | Hugie et al. |
| 2013/0238142 A1 | 9/2013 | Nichols et al. |
| 2013/0245838 A1 | 9/2013 | Zywicki et al. |
| 2013/0246944 A1 | 9/2013 | Pandiyan et al. |
| 2013/0261804 A1 | 10/2013 | Casilli |
| 2013/0261807 A1 | 10/2013 | Zywicki et al. |
| 2013/0278384 A1 | 10/2013 | McDowell et al. |
| 2013/0297078 A1 | 11/2013 | Kolavennu |
| 2013/0305164 A1 | 11/2013 | Karunamuni et al. |
| 2013/0310053 A1 | 11/2013 | Srivastava et al. |
| 2013/0318217 A1 | 11/2013 | Imes et al. |
| 2013/0331087 A1 | 12/2013 | Shoemaker et al. |
| 2013/0332000 A1 | 12/2013 | Imes et al. |
| 2013/0332007 A1 | 12/2013 | Louboutin |
| 2013/0340993 A1 | 12/2013 | Siddaramanna et al. |
| 2013/0345882 A1 | 12/2013 | Dushane et al. |
| 2014/0031989 A1 | 1/2014 | Bergman et al. |
| 2014/0031991 A1 | 1/2014 | Bergman et al. |
| 2014/0070919 A1 | 3/2014 | Jackson et al. |
| 2014/0085092 A1 | 3/2014 | Fadell et al. |
| 2014/0149434 A1 | 5/2014 | Aravamudan et al. |
| 2014/0156087 A1 | 6/2014 | Amundson |
| 2014/0164118 A1 | 6/2014 | Polachi |
| 2014/0167961 A1 | 6/2014 | Finlow-Bates |
| 2014/0172176 A1 | 6/2014 | Deilmann et al. |
| 2014/0184406 A1 | 7/2014 | Trundle et al. |
| 2014/0197960 A1 | 7/2014 | Taylor, Jr. et al. |
| 2014/0200718 A1 | 7/2014 | Tessier |
| 2014/0244048 A1 | 8/2014 | Ramachandran et al. |
| 2014/0266635 A1 | 9/2014 | Roth et al. |
| 2014/0277762 A1 | 9/2014 | Drew |
| 2014/0302879 A1 | 10/2014 | Kim et al. |
| 2014/0316581 A1 | 10/2014 | Fadell et al. |
| 2014/0319232 A1 | 10/2014 | Gourlay et al. |
| 2014/0325398 A1 | 10/2014 | Van de bruggen et al. |
| 2014/0330435 A1 | 11/2014 | Stoner et al. |
| 2014/0337123 A1 | 11/2014 | Neurenberg et al. |
| 2014/0349672 A1 | 11/2014 | Kern et al. |
| 2014/0370911 A1 | 12/2014 | Gorgenyi et al. |
| 2015/0009878 A1 | 1/2015 | Kim et al. |
| 2015/0058779 A1 | 2/2015 | Bruck et al. |
| 2015/0065161 A1* | 3/2015 | Ganesh .............. H04W 4/021 455/456.1 |
| 2015/0094860 A1 | 4/2015 | Finnerty et al. |
| 2015/0094865 A1 | 4/2015 | Choi et al. |
| 2015/0096876 A1 | 4/2015 | Mittleman et al. |
| 2015/0097682 A1 | 4/2015 | Rossi et al. |
| 2015/0097686 A1 | 4/2015 | Fadell et al. |
| 2015/0097688 A1 | 4/2015 | Bruck et al. |
| 2015/0097689 A1 | 4/2015 | Logue et al. |
| 2015/0122575 A1 | 5/2015 | Park et al. |
| 2015/0128050 A1 | 5/2015 | Cormican et al. |
| 2015/0140994 A1 | 5/2015 | Partheesh et al. |
| 2015/0141045 A1 | 5/2015 | Qiu et al. |
| 2015/0159895 A1* | 6/2015 | Quam .................. F24F 11/006 700/275 |
| 2015/0159901 A1 | 6/2015 | Quam et al. |
| 2015/0159903 A1 | 6/2015 | Marak et al. |
| 2015/0159904 A1 | 6/2015 | Barton |
| 2015/0163631 A1* | 6/2015 | Quam .................. F24F 11/006 455/456.1 |
| 2015/0163945 A1 | 6/2015 | Barton et al. |
| 2015/0169895 A1 | 6/2015 | Gkoulalas-Divanis et al. |
| 2015/0186497 A1 | 7/2015 | Patton et al. |
| 2015/0195100 A1 | 7/2015 | Imes et al. |
| 2015/0237470 A1 | 8/2015 | Mayor et al. |
| 2015/0271638 A1 | 9/2015 | Menayas et al. |
| 2015/0301543 A1 | 10/2015 | Janoso et al. |
| 2016/0007156 A1 | 1/2016 | Chiou et al. |
| 2016/0057572 A1 | 2/2016 | Bojorquez Alfaro et al. |
| 2016/0142872 A1 | 2/2016 | Bojorquez Alfaro et al. |
| 2016/0223998 A1 | 5/2016 | Nicholson et al. |

FOREIGN PATENT DOCUMENTS

| | | |
|---|---|---|
| CN | 101311459 | 11/2008 |
| CN | 102449990 | 5/2012 |
| CN | 102665166 | 9/2012 |
| CN | 101676698 | 11/2012 |
| CN | 102934467 | 2/2013 |
| CN | 101689327 | 5/2013 |
| CN | 203949733 | 11/2014 |
| CN | 103282754 | 5/2015 |
| DE | 2036829 | 1/1972 |
| DE | 2404758 | 8/1975 |
| DE | 2321715 | 1/1983 |
| DE | 3334117 | 4/1985 |
| DE | 3703465 | 8/1988 |
| DE | 69001779 | 1/1994 |
| EP | 0070414 | 1/1983 |
| EP | 0434926 | 8/1995 |
| EP | 0678204 | 3/2000 |
| EP | 0985994 | 3/2000 |
| EP | 1033641 | 9/2000 |
| EP | 1074009 | 7/2001 |
| EP | 1143232 | 10/2001 |
| EP | 0735516 | 6/2004 |
| EP | 1515289 | 3/2005 |
| EP | 2138919 | 12/2009 |
| EP | 2607802 | 6/2013 |
| EP | 2675195 | 12/2013 |
| EP | 2849153 | 3/2015 |
| FR | 2711230 | 4/1995 |
| GB | 1116364 | 6/1968 |
| GB | 2333494 | 7/1999 |
| JP | 53009910 | 1/1978 |
| JP | 59086812 | 5/1984 |
| JP | 60116154 | 6/1985 |
| JP | 60211321 | 10/1985 |
| JP | 61005269 | 1/1986 |
| JP | 02156125 | 6/1990 |
| JP | 03038617 | 2/1991 |
| JP | 03209704 | 9/1991 |
| JP | H10-23565 | 1/1993 |
| JP | 05079933 | 3/1993 |
| JP | 06036904 | 2/1994 |
| JP | 08153601 | 11/1996 |
| JP | 09306317 | 11/1997 |
| JP | H9-298780 | 11/1997 |
| JP | 11126727 | 5/1999 |
| JP | 3156750 | 4/2001 |
| JP | 2008004627 | 10/2008 |
| JP | 2009293353 | 12/2009 |
| JP | 2012013564 | 1/2012 |
| JP | 5113691 | 1/2013 |
| JP | 5234043 | 7/2013 |
| JP | 5274948 | 8/2013 |
| JP | 5407492 | 2/2014 |

(56) References Cited

FOREIGN PATENT DOCUMENTS

| | | |
|---|---|---|
| KR | 2006029736 | 4/2006 |
| MX | 2012000906 | 9/2012 |
| WO | WO-85/01851 | 4/1985 |
| WO | WO-96/21264 | 7/1996 |
| WO | WO 97/11448 | 3/1997 |
| WO | WO 97/39392 | 10/1997 |
| WO | WO-98/08179 | 2/1998 |
| WO | WO-9853677 | 12/1998 |
| WO | WO 00/43870 | 7/2000 |
| WO | WO 00/57259 | 9/2000 |
| WO | WO 01/52515 | 7/2001 |
| WO | WO 01/79952 | 10/2001 |
| WO | WO 02/23744 | 3/2002 |
| WO | WO 02/27687 | 4/2002 |
| WO | WO-03032103 | 4/2003 |
| WO | WO-2006/096854 | 9/2006 |
| WO | WO 2009/034720 | 3/2009 |
| WO | WO 2009/036764 | 3/2009 |
| WO | WO 2009/067251 | 5/2009 |
| WO | WO 2010/021700 | 2/2010 |
| WO | WO 2011/011404 | 1/2011 |
| WO | 2011149600 A2 | 12/2011 |
| WO | WO 2012/000107 | 1/2012 |
| WO | WO 2012/068517 | 5/2012 |
| WO | WO 2013/170791 | 11/2013 |
| WO | WO 2014/016705 | 1/2014 |
| WO | WO 2014/047501 | 3/2014 |
| WO | WO 2014/144323 | 9/2014 |
| WO | WO 2014/197320 | 12/2014 |
| WO | WO-2014200524 | 12/2014 |
| WO | WO-2015047739 | 4/2015 |
| WO | WO-2015089116 | 6/2015 |
| WO | WO-2015164400 | 10/2015 |

OTHER PUBLICATIONS

Turner, Michele, "Introducing Family Accounts and Home/Away Assist", Nest blog, Mar. 10, 2016 (accessed from <<https://nest.com/blog/2016/03/10/introducing-family-accounts-and-home-away-assist/>> on Jan. 18, 2019). (Year: 2016).*
The International Search Report and Written Opinion for PCT Application No. PCT/US2017/043376.
"Comfort™ Programmable Owner's Manual," Carrier Touch-N-Go™, 60 pages, 2010. Catalog No. 0M-TCPHP-4CA, Replaces: OM-TCPHP-3CA.
"CorAccess Systems/in Home," http://web.archive.org/web20011212084427/www.coraccess.com/home.html, 1 page, copyright 2001, printed Aug. 19, 2004.
"HAI Company Background," http://www.homeauto.com/AboutHAI/abouthai_main.htm, 2 pages, printed Aug. 19, 2004.
"High-tech options take hold in new homes—Aug. 28, 200—Dallas Business Journal," http://bizjournals.com/dallas/stories/2000/08/28/focus4, 3 pages, dated Aug. 28, 2000, printed Aug. 19, 2004.
"Home Toys Review—TouchLinc", http://www.hometoys.com/htinews/aug99/reviews/touchlinc/touchlinc.htm, 3 pages, dated Aug. 1999, printed Aug. 20, 2004.
"HTI News Release," http://www.hometoys.com/htinews/apr99/releases/ha101.htm, 3 pages, Apr. 1999.
"Mark of Excellence Award Finalist Announced," http://64.233.167.104/search?Q32 cache:ciOA2YtYaBIJ:www.hometoys.com/releases/mar. . . , 6 pages, Leopard Touchscreen on p. 2, dated prior to Mar. 4, 2000, printed Aug. 20, 2004.
"Product Review—Philips Pronto Remote Control," http://hometheaterhifi.com/volume_6_2/philipsprontoremotecontrol.html, 5 pages, dated May 1999, printed Aug. 20, 2004.
"RC X10 Automation Forum: Control your Heating and Cooling System with Pronto(1/1)," http://www.remotecentral.com/cgi-bin/mboard/rc-x10/thread.cgi?12, 2 pages, dated Apr. 23, 1999, printed Aug. 20, 2004.
"RCS X10 Thermostat Plug-in for Home Seer Beta Version," 25 pages, Downloaded Sep. 9, 2011.

"Spotlight on Integrated Systems," Custom Builder, V8, N2, p. 66(6), Mar.-Apr. 1993.
"Vantage Expands Controls for Audio/Video, HVAC and Security," http://www.hometoys.com/htinews/aug99/releases/vantage03.htm, 2 pages, dated Aug. 3, 1999, printed Aug. 20, 2004.
ADI, "Leopard User Manual," 93 pages, 2001.
Adicon 2500, "The Automator," 4 pages, Oct.-Dec. 2000.
ADT Security Services, "iCenter AdVanced User Interface 8142ADT," Installation and Setup Guide, 4 pages, May 2001.
AED Electronics, Inc., "Presenting Climatouch the Most Innovative Thermostat in the World!," 2 pages, prior to Nov. 30, 2007.
Alarm.com "Company Information," 1 page, printed Apr. 24, 2012.
Alarm.com "Keep it cozy," 1 page, printed Apr. 24, 2012.
Allure, "Our Technology," Allure Energy Inc., 1 page, 2012.
Andrews et al., "Clicky: User-Centric Input for Active Spaces," 17 pages, Aug. 2004.
Aprilaire Electronic Thermostats Models 8344, 8346, 8348, 8363, 8365, 8366 Operating Instructions, 8 pages, 2003.
Aube Technologies, Electronic Thermostat for Heating System Model TH135-01, 5 pages, Aug. 14, 2001.
Aube Technologies, TH140-28 Electronic Programmable Thermostat, Installation Instructions and User Guide, pp. 1-4, Jan. 22, 2004.
AutomatedBuildings.com Article—"Thin Client" Solutions, "Pressure, Air Flow, Temperature, Humidity & Valves," Dwyer Instruments, Inc., 5 pages, printed Sep. 20, 2004.
Balaji et al., "Sentinel: Occupancy Based HVAC Actuation Using Existing WiFi Infrastructure Within Commercial Buildings," SenSys '13, 14 pages, Nov. 11-15, 2015.
Blake et al., "Seng 310 Final Project Demo Program" Illustration, 3 pages, Apr. 6, 2001.
Blake et al., "Seng 310 Final Project" Report, 52 pages, Apr. 6, 2001.
Blister Pack Insert from a Ritetemp 8082 Touch Screen Thermostat Product, 2 pages, 2002.
Braeburn Model 3000 Owner's Manual, pp. 1-13, 2001.
Braeburn Model 5000 Owner's Manual, pp. 1-17, 2001.
BRK Electronics Maximum Protection Plus Ultimate Convenience Smoke Alarm, 24 pages, Sep. 2000.
BRK First Alert, User's Manual, Smoke and Fire Alarms, pp. 1-7, Nov. 2002.
Business Wire, "MicroTouch Specialty Products Group to Capitalize on Growing Market for Low-Cost Digital Matrix Touchscreens," p. 1174 (2 pages), Jan. 6, 1999.
Cardio Manual, available at http://www.secant.ca/En/Documentation/Cardio2é-Manual.pdf, Cardio Home Automation Inc., 55 pages, printed Sep. 28, 2004.
Cardio, by Secant; http://www.hometoys.com/htinews/apr98/reviews/cardio.htm, "HTINews Review," Feb. 1998, 5 pages, printed Sep. 14, 2004.
Carrier Microelectronic Programmable Thermostat Owner's Manual, pp. 1-24, May 1994.
Carrier TSTATCCRF01 Programmable Digital Thermostat, pp. 1-21, prior to Apr. 21, 2005.
Carrier, "Edge Performance Programmable Owner's Manual," 64 pages, 2007.
Carrier, "Programmable Dual Fuel Thermostats," Installation, Start-Up & Operating Instructions, pp. 1-12, Oct. 1998.
Carrier, "Programmable Thermostats," Installation, Start-Up & Operating Instructions, pp. 1-16, Sep. 1998.
Carrier, "Standard Programmable Thermostat," Homeowner's Manual, pp. 1-8 pages, 1998.
Carrier, "Thermidistat Control," Installation, Start-Up, and Operating Instructions, pp. 1-12, Aug. 1999.
Castle, "Ready for Thermostat Wars?," available at http://greentechadvocates.com/2012/03/08/ready-for-thermostat-wars/, 3 pages, May 8, 2012.
Climatouch, User Manual, Climatouch CT03TSB Thermostat, Climatouch CT03TSHB Thermostat with Humidity Control, Outdoor UHF Temperature Transmitter 217S31, 19 pages, Printed Sep. 15, 2004.
"Petition for Inter Partes Review of U.S. Pat. No. 8,571,518 Pursuant to 35 U.S.C. 311-319, 37 CFR 42," Inventor Imes et al., dated Oct. 29, 2014.

(56) References Cited

OTHER PUBLICATIONS

International Search Report for Corresponding Application No. PCT/US2010/042589 dated Nov. 22, 2010.
U.S. Appl. No. 14/640,984, filed Mar. 6, 2015.
U.S. Appl. No. 14/668,800, filed Mar. 25, 2015.
U.S. Appl. No. 14/696,662, filed Apr. 27, 2015.
U.S. Appl. No. 14/696,725, filed Apr. 27, 2015.
U.S. Appl. No. 14/933,948, filed Nov. 5, 2015.
U.S. Appl. No. 14/934,543, filed Nov. 6, 2015.
U.S. Appl. No. 14/938,595, filed Nov. 11, 2015.
U.S. Appl. No. 14/938,642, filed Nov. 11, 2015.
U.S. Appl. No. 14/964,264, filed Dec. 9, 2015.
U.S. Appl. No. 14/964,349, filed Dec. 9, 2015.
U.S. Appl. No. 15/048,902, filed Feb. 19, 2016.
U.S. Appl. No. 61/179,224, filed May 18, 2009.
CorAccess, "Companion 6," User Guide, pp. 1-20, Jun. 17, 2002.
Danfoss RT51/51RF & RT52/52RF User Instructions, 2 pages, Jun. 2004.
DeKoven et al., "Designing Collaboration in Consumer Products," 2 pages, 2001.
DeKoven et al., "Measuring Task Models in Designing Intelligent Products," 2 pages, Jan. 13-16, 2002.
DESA Heating Products, "Wireless Hand-Held Remote Control Sets Models (C) GHRCB and (C) GHRCTB, Operating Instructions," 4 pages, May 2003.
Ditosti, "Alarm.com Cloud Service May Prove to be Smartest Thermostat to Date," downloaded from http://www.alarm.com/about/media/MediaGeneric.aspx?cmid=41, 2 pages, printed Feb. 29, 2012.
Do, "Programmable Communicating Thermostats for Demand Response in California," DR ETD Workshop, 26 pages, Jun. 11, 2007.
Domotique Secant Home Automation—Web Page, available at http://www.secant.ca/En/Company/Defaultasp, 1 page, printed Sep. 28, 2004.
Edina Realty, "Warranties," 3 pages, prior to 2014.
"Emme Core User Guide," Version 1.1, 47 pages, Jan. 2011.
Firex Smoke Alarm, Ionization Models AD, ADC Photoelectric Model Pad, 4 pages, prior to Apr. 21, 2005.
Fluke, "561 HVAC Pro" Infrared Thermometer User's Manual, 22 pages, Downloaded May 24, 2012.
Freudenthal et al., "Communicating Extensive Smart Home Functionality to Users of All Ages: the Design of a Mixed-Initiative Multimodal Thermostat-Interface," pp. 34-39, Mar. 12-13, 2001.
Gentex Corporation, HD135, 135° Fixed Temperature Heat Detector AC Powered, 120V, 60Hz With Battery Backup, Installation Instructions—Owner's Information, pp. 1-5, Jun. 1, 1998.
Gentex Corporation, 9000 Series, Photoelectric Type Single Station/Multi-Station Smoke Alarms Ac Powered With Battery Backup, Installation Instructions—Owner's Information, pp. 9-1 to 9-6, Jan. 1, 1993.
Green, "PM's Thermostat Guide," Popular Mechanics, pp. 155-158, Oct. 1985.
Gupta et al., "Adding GPS-Control to Traditional Thermostats: An Exploration of Potential Energy Savings and Design Challenges," Pervasive, LNCS 5538, pp. 95-114, 2009.
Gupta, "A Persuasive GPS-Controlled Thermostat System," Master's Thesis, Massachusetts Institute of Technology, 89 pages, Sep. 2008.
Guttman, "Autoconfiguration for IP Networking: Enabling Local Communication," 6 pages, IEEE Internet Computing, Jun. 2011.
Harris et al., "Optimizing Memory Transactions," Microsoft Research Harvard University, 12 pages, May 25, 2012.
Honeywell Brivis Deluxe Programmable Thermostat, pp. 1-20, 2002.
Honeywell Brivis T8602C Chronotherm IV Deluxe Programmable Thermostats, Installation Instructions, pp. 1-12, 2002.
Honeywell CT8602C Professional Fuel Saver Thermostat, pp. 1-6, 1995.
Honeywell Electronic Programmable Thermostat, Owner's Guide, pp. 1-20, 2003.
Honeywell Electronic Programmable Thermostats, Installation Instructions, pp. 1-8, 2003.
Honeywell News Release, "Honeywell's New Sysnet Facilities Integration System for Boiler Plant and Combustion Safety ProceSSes," 4 pages, Dec. 15, 1995.
Honeywell T8002 Programmable Thermostat, Installation Instructions, pp. 1-8, 2002.
Honeywell T8602A,B,C,D and TS8602A,C Chronotherm III Fuel Saver Thermostats, Installation Instructions, pp. 1-12, 1995.
Honeywell T8602D Chronotherm IV Deluxe Programmable Thermostats, Installation Instructions, pp. 1-12, 2002.
Honeywell TH8000 Series Programmable Thermostats, Owner's Guide, pp. 1-44, 2004.
Honeywell, "Excel Building Supervisor-Integrated R7044 and FS90 Ver. 2.0," Operator Manual, 70 pages, Apr. 1995.
Honeywell, "Installation Guide: Wireless Entry/Exit Remote," 12 pages, 2011.
Honeywell, "Introduction of the 57350A Honeywell WebPAD Information Appliance," Home and Building Control Bulletin, 2 pages, Aug. 29, 2000; Picture of WebPad Device with touch screen, 1 Page; and screen shots of WebPad Device, 4 pages.
Honeywell, "RedLINK™ Wireless Comfort Systems," RedLINK Wireless Technology, 8 pages, Aug. 2011.
Honeywell, "Total Connect Online Help Guide," Revision A, 800-02577-TC, Mar. 2010.
Honeywell, "Total Connect User Guide," Revision B, 34 pages, May 15, 2012.
Honeywell, "VisionPRO® 8000 Thermdstats," Homeywell International Inc., 2 pages, downloaded May 24, 2012.
Honeywell, "W7006A Home Controller Gateway User Guide," 31 pages, Jul. 2001.
Honeywell, MagicStat® CT3200 Programmable Thermostat, Installation and Programming Instructions, pp. 1-24, 2001.
Honeywell, Wireless Entry/Exit Remote, Operating Manual, 9 pages, 2011.
http://community.lockitron.com/notifications-geofencing-scheduling-sense-bluetooth/633, "Lockitron Community, Notifications, Geofencing, Scheduling, Sense/Bluetooth," 14 pages, printed Oct. 29, 2014.
http://hunter-thermostats.com/hunter_programmable_thermostats.html, Hunter Thermostat 44668 Specifications, and 44758 Specifications, 2 pages, Printed Jul. 13, 2011.
http://stackoverflow.com/questions/14232712/tracking-multiple-20-locations-with-ios-geofencing, "Tracking Multiple (20+) Locations with iOS Geofencing—Stack Overflow," 2 pages, printed Oct. 29, 2014.
http://www.alarm.com/about/media/MediaGeneric.aspx?cmid=39, "Alarm.com Cloud Services May Yield Smartest Thermostats on the Planet," Alarm.com, 2 pages, printed Apr. 24, 2012.
http://www.allure-energy.com/aenf_jan9_12.html, "CES Gets First Look at EverSense," Allure Energy, 2 pages, printed Feb. 17, 2015.
http://www.cc.gatech.edu/computing/classes/cs6751_94_fall/groupc/climate-2/node1.html, "Contents," 53 pages, printed Sep. 20, 2004.
http://www.energyhub.com/news/earth-networks-and-energyhub-debut-e5-home-energy-d . . . , "Earth Networks and EnergyHub Debut e5 Home Energy Demand Response Program Based on Neighborhood-LEvel, Real-Time Weather," EnergyHub, 2 pages, printed Jan. 24, 2012.
http://www.ritetemp.info/rtMenu_13.html, Rite Temp 8082, 6 pages, printed Jun. 20, 2003.
http://www.sync-blog.com/sync/2012/01/how-to-control-your-thermostat-from-anywhere- . . . , "How to Control Your Thermostat from Anywhere Without Breaking the Bank," Sync(TM) Blog, 2 pages, printed Apr. 27, 2012.
http://www.thermostatsales.com, Robertshaw, "9610 Digital Programmable Thermostat," 3 pages, printed Jun. 17, 2004.
http://www.thermostatsales.com, Robertshaw, "9700 Deluxe Programmable Thermostat" 3 pages, printed Jun. 17, 2004.
http://www.thermostatsales.com, Robertshaw, "9710 Deluxe Programmable Thermostat," 3 pages, printed Jun. 17, 2004.
http://www.thermostatsales.com, Robertshaw, "9720 Deluxe Programmable Thermostat," 3 pages, printed Jun. 17, 2004.
http://IWww.pmev.tswire.com/nev.ts-releases/allure-energy-unveils-a-combination-of-ibeacon-and-nfc-enabled-smart-sensor-technology-

(56) References Cited

OTHER PUBLICATIONS known-as-aura-23885 . . . , "Allure Energy Unveils a Combination of iBeacon and NFC Enabled Smart Sensor Technology Known as Aura," 6 pages, Jan. 6, 2014.
Hunter, "44200/44250," Owner's Manual, 32 pages, prior to Jul. 7, 2004.
Hunter, "44300/44350," Owner's Manual, 35 pages, prior to Jul. 7, 2004.
Hunter, "Auto Saver 550", Owner's Manual Model 44550, 44 pages, prior to Jul. 7, 2004.
Hunter, "Model 44758 Remote Sensor," Owner's Manual, 2 pages, Sep. 4, 2008.
Install Guide for Ritetemp Thermostat 8082, 6 pages, 2002.
Invensys™, "9700i 9701i 9715i 9720i Deluxe Programmable Thermostats," User's Manual, pp. 1-28, prior to Jul. 7, 2004.
Jacobson, "Xfinity Expands Home Automation with Ecofactor Cloud-Based Enabled Thermostats," downloaded from http://www.cepro.com/article/print/xfinity_expands_home_automation_with_ecofactor_cl . . . , 4 pages, Mar. 5, 2012.
LaMonica, "Smart Thermostat Links to Cloud for Energy Savings," available at http://news.cnet.com/8031-11128_3-20086261-54/smart-thermost-links-to-cloud-for-ene . . . , 3 pages, printed Apr. 24, 2012.
Lennox, "Network Control Panel (NCP)," User's Manual, 18 pages, Nov. 1999.
Lennox, "Prodigy Control System," Lennox Industries, 4 pages, May 25, 2012.
Logitech, "Harmony 880 Remote User Manual," v. 1, pp. 1-15, prior to Nov. 30, 2007.
Lux ELV1 Programmable Line Voltage Thermostat, Installation Instructions, 3 pages, prior to Jul. 7, 2004.
Lux TX500 Series Smart Temp Electronic Thermostat, 3 pages, prior to Jul. 7, 2004.
Lux TX9000 Installation, 3 pages, prior to Apr. 21, 2005.
Lux, "9000RF Remote Instructions," 2 pages, prior to Nov. 30, 2007.
Lux, "511 Series Smart Temp Electronic Thermostat," Owner's Manual, 3 pages, prior to Jul. 7, 2004.
Lux, "600 Series Smart Temp Electronic Thermostat," Owner's Manual, 3 pages, prior to Jul. 7, 2004.
Lux, "602 Series Multi-Stage Programmhble Thermostat," Owner's Manual, 2 pages, prior to Jul. 7, 2004.
Lux, "605/2110 Series Programmable Heat Pump Thermostat," Owner's Manual, 3 pages, prior to Jul. 7, 2004.
Lux, "700/9000 Series Smart Temp Electronic Thermostat," Owner's Manual, 3 pages, prior to Jul. 7, 2004.
Lux, "PSPH521 Series Programmable Heat Pump Thermostat," Owner's Manual, 3 pages, prior to Jul. 7, 2004.
Lux, "TX1500 Series Smart Temp Electronic Thermostat," Owner's Manual, 6 pages, prior to Jul. 7, 2004.
Metasys, "HVAC PRO for Windows User's Manual," 308 pages, 1998.
Mobile Integrated Solutions, LLC, "MobiLinc Take Control of Your Home, MobiLinc and Geo-Fence Awareness," 9 pages, downloaded Mar. 27, 2015.
Mounting Template for Ritetemp Thermostat 8082, 1 page, 2002.
Mozer, "The Neural Network House: An Environment that Adapts to its Inhabitants," Department of Computer Science and Institute of Cognitive Science University of Colorado, 5 pages, 1998.
OMRON Electronic Components, LLC, "Micro Tilt Sensor D6B," Cat. No. JB301-E3-01, 6 pages, Mar. 2005.
OMRON Electronic Components, LLC, "Micro Tilt Sensor D6B," Cat. No. BO2WAD1, 2 pages, Jun. 2002.
Operation Manual for Ritetemp Touch Screen Thermostat 8082, 8 pages, 2002.
Pan et al., "A Framework for Smart Location-Based Automated Energy Controls in a Green Building Testbed," 6 pages, downloaded Jan. 30, 2015.
Proliphix, "Web Enabled IP Thermostats Intelligent HVAC Control," Proliphix Inc., 2 pages, on or before Aug. 28, 2004.
Proliphix, "Web Enabled IP Thermostats, Ultimate in Energy Efficiency!," Proliphix Inc., 2 pages, on or before Aug. 28, 2004.
Proliphix, Inc., "NT10e & NT20e," 54 pages, on or before Aug. 30, 2005.
Quick Start Guide for Ritetemp Thermostat 8082, 1 page, 2002.
Remote Control Power Requirement for Ritetemp Thermostat 8082, 1 page, 2002.
Ritetemp Operation 8029, 3 pages, Jun. 19, 2002.
Ritetemp Operation 8050, 5 pages, Jun. 26, 2002.
Ritetemp Operation 8085, pp. 1-6, prior to Apr. 21, 2005.
Saravanan et al, "Reconfigurable Wireless Interface for Networking Sensors," IJCSNS International Journal of Computer Science and Network Security, vol. 8 No. 7, pp. 270-276. Revised Jul. 20, 2008.
Screenshot of http://lagotek.com/index.html?currentSection=TouchIt, Lagotek, 1 page, prior to Mar. 29, 2012.
Sealed Unit Parts Co., Inc., Supco & CTC Thermostats . . . loaded with features, designed for value!, 6 pages, prior to Apr. 21, 2005.
Sharp Corporation, "GP1S036HEZ Phototransistor Output, Transmissive Photointerrupter with Tilt Direction (4-Direction) Detecting," pp. 1-11, Oct. 3, 2005.
SmartAC, "Thermostat Programming Web Site Guide," PG-WC-7E, 2 pages, 2009.
Travis Industries, Remote Fireplace Thermostat, Part #99300651, 6 pages, printed Feb. 3, 2003.
Trouble Shooting Guide for Ritetemp Thermostat 8082, 1 page, 2002.
Visor Handheld User Guide, 280 pages, Copyright 1999-2000.
Warmly Yours, "Model TH111GFCI-P (120 VAC)," Manual, pp. 1-4, prior to Jul. 7, 2004.
White-Rodgers 1F80-224 Programmable Electronic Digital Thermostat, Installation and Operation Instructions, 8 pages, prior to Apr. 21, 2005.
White-Rodgers Comfort-Set III Thermostat, pp. 1-44, prior to Jul. 7, 2004.
White-Rodgers Installation Instructions for Heating & Air Conditioning IF78 Non-Programmable Thermostat, 6 pages, prior to Apr. 21, 2005.
White-Rodgers Installation Instructions for Heating & Air Conditioning IF78 5/2 Day Programmable Thermostat, 7 pages, prior to Jul. 7, 2004.
White-Rodgers, "Installation Instructions for Heating & Air Conditioning IF72 5/2 Day Programmable Heat Pump Thermostat," 8 pages, prior to Jul. 7, 2004.
White-Rodgers, "Comfort-Set 90 Series Thermostat," Manual, pp. 1-24, prior to Jul. 7, 2004.
White-Rodgers, 1F80-240 "(for Heating Only systems) Programmable Electronic Digital Thermostat," Installation and Operation Instructions, 8 pages, prior to Jul. 7, 2004.
White-Rodgers, 1F80-241 "Programmable Electronic Digital Thermostat," Installation and Operation Instructions, 6 pages, prior to Jul. 7, 2004.
White-Rodgers, 1F80-261 "Programmable Electronic Digital Thermostat," Installation and Operation Instructions, 8 pages, prior to Jul. 7, 2004.
White-Rodgers, 1F81-261 "Programmable Electronic Digital Multi-Stage Thermostat," Installation and Operation Instructions, 8 pages, prior to Jul. 7, 2004.
White-Rodgers, 1F82-261 "Programmable Electronic Digital Heat Pump Thermostat," Installation and Operation Instructions, 8 pages, prior to Jul. 7, 2004.
White-Rodgers, Comfort-Set 90 Series Premium, 4 pages, prior to Apr. 21, 2005.
www.icmcontrols.com, Simplecomfort, SC3000 Single Stage Heat/Single Stage Cool or Single Stage Heat Pump/Manual Changeover, 1 page, prior to Jul. 7, 2004.
www.icmcontrols.com, Simplecomfort, SC3001 Single Stage Heat/Single Stage Cool or Single Stage Heat Pump/Manual Changeover, 1 page, prior to Jul. 7, 2004.
www.icmcontrols.com, Simplecomfort, SC3006 Single Stage Heat/Single Stage Cool or Single Stage Heat Pump/Manual Changeover, 1 page, prior to Jul. 7, 2004.
SmartThings Inc., "2 Ecobee Si Thermostat + Geofencing," 17 pages, downloaded Nov. 3, 2014.

(56) References Cited

OTHER PUBLICATIONS

St. John, "Smart Grid's Latest Cloud: Honeywell Cloud-Connected Thermostats," 7 pages, Nov. 3, 2011.
Totaline Model P474-1035 Owner's Manual Programmable 5-2 Day Digital Thermostat, pp. 1-21, Apr. 2003.
Totaline Star CPE230RF, Commercial Programmable Thermostat Wireless Transmitter, Owner's Manual, pp. 1-16, Oct. 1998.
Totaline Star P/N P474-0130 Non-Programmable Digital Thermostat Owner's Manual, pp. 1-22, prior to Apr. 21, 2005.
Totaline, "1 for All Programmable Digital Thermostat," Owner's Manual P/N P374-1100FM, 23 pages, Nov. 1998.
Totaline, "1 for All Programmable Digital Thermostat," Owner's Manual P/N P474-1050, 21 pages, Nov. 1998.
Totaline, "1 for All Programmable Digital Thermostat," Owner's Manual P/N P374-1100, 24 pages, Apr. 2001.
Totaline, "Intellistat Combination Temperature and Humidity Control," Owner's Manual P/N P374-1600, 25 pages, Jun. 2001.
Totaline, "P/N P374-0431 Thermostat Remote Control and Receiver," Owner's Manual, 11 pages, prior to Nov. 30, 2007.
Totaline, "P474-1100RF, P474-1100REC Wireless Thermostat," 1 page, prior to Nov. 30, 2007.
Totaline, "Programmable Thermostat Configurable for Advanced Heat Pump or Dual Fuel Operation," Owner's Manual P/N P374-1500, 24 pages, Jun. 1999.
Totaline, "Wireless Remote Sensor, Model P474-0401-1RF/REC," 2 pages, prior to Nov. 30, 2007.
Totaline, "Instructions P/N P474-1010", Manual, 2 pages, Dec. 1998.
Totaline, "Programmable Thermostat", Homeowner's Guide, 27 pages, Dec. 1998.
Totaline, "Wireless Programmable Digital Thermostat," Owner's Manual 474-1100RF, 22 pages, 2000.
Trane, "System Programming, Tracer Summit Version 14, BMTW-SVP01D-EN," 623 pages, 2002.
Trane, "Wireless Zone Sensor. Where Will Wireless Technology Take You?," 4 pages, Feb. 2006.
www.icmcontrols.com, Simplecomfort; SC3201 2 Stage Heat Pump Manual Changeover, 1 page, prior to Jul. 7, 2004.
www.icmcontrols.com, Simplecomfort, SC3801 2 Stage Heat/2 Stage Cool 2 Stage Heat Pump/Audio Changeover, 1 page, prior to Jul. 7, 2004.
Xytronix Research & Design, Inc., "X-300 User's Manual, Revision 1.2" 89 pages, Jul. 30, 2009.
"Energy User News," Chilton Company, ISSN: 0162-9131, Mar. 1, 1997, 4 pp.
Andover Controls "Network News" Andover Controls Corporation, vol. 2, No. 2, 8 pages, 1997. (Applicant points out, in accordance with MPEP 609.04(a), that the year of publication, 1997 is sufficiently earlier than the effective U.S. filing date, so that the particular month of publication is not in issue.).
Andover Controls, "Andover Controls World," Andover Controls Corporation , 4 pages, 1997. (Applicant points out, in accordance with MPEP 609.04(a), that the year of publication, 1997 is sufficiently earlier than the effective U.S. filing date, so that the particular month of publication is not in issue.).
Andover Controls, "Facility Management Unleashed," Andover Controls Corporation, 6 pages, 2002. (Applicant points out, in accordance with MPEP 609.04(a), that the year of publication, 2002 is sufficiently earlier than the effective U.S. filing date, so that the particular month of publication is not in issue.).
Bay Controls LLC "Bayweb thermostat Advanced Model Owner's Manual", Oct. 6, 2011, 31 pgs (Year: 2011).
Carrier ComfortChoice "Verifiable Demand Response, Two-Way Communicating Thermostat," accessed from http://www.comfortchoice.com, 2007, 4 pp. (Applicant points out, in accordance with MPEP 609.04(a), that the year of publication, 2007 is sufficiently earlier than the effective U.S. filing date, so that the particular month of publication is not in issue.).
Carrier ComfortChoice, "Web Interface, User Guide," Jan. 2002. 8 pp.
Central and Southwest Communications, "Customer Choice and Control Thermostat Touchpad, User Guide," 69-1005, May 1996, 18 pp.
Comverge, Inc., "Adaptive Algorithms Yield Greater Performance," 2 pages, prior to Jun. 28, 2007.
Comverge, Inc., "SuperStat Thermostat Family," 2 pages, prior to Jun. 28, 2007.
Facility Robotics Solutions Direct, "Who We Are and What We Do," Solutions Direct, 2 pages, Sep. 19, 1997.
Facility Robotics Solutions, "Where Can I go to Find Everything I Need to Put Together Lon Works-Based Automation Systems?," Solutions Direct, 5 pages, prior to Jun. 28, 2007.
Federal Energy Regulatory Commission, "Assessment of Demand Response & Advanced Metering, Staff Report," 228 pages, Aug. 2006.
Gentec, "Feature Focus, Threat Level Management," 2 pages, 2013. (Applicant points out, in accordance with MPEP 609.04(a), that the year of publication, 2013 is sufficiently earlier than the effective U.S. filing date, so that the particular month of publication is not in issue.).
Higgins "First Time User Experiences," 273 pages, downloaded May 12, 2015.
Higgins, "First Time User Experiences in Mobile Apps," http://lwww.kryshiggins.com/first-timeuser-exoeriences-in-mobile-aoos/, 14 pages, printed May 12, 2015.
"Amazon.com: Metal Wall Plate. Medium 10" × 12" Hanging Magnetic Spice Rack Wall Mount, Stainless Steel Plate for Backsplash or Cupboard . . . " accessed from http://www.amazon.com/Magnetic-Spice-Stainless-Backsplash-Cupboard/dp/B009CUIYMO 5 pages, printed Jul. 23, 2015.
"Switchplates, Magnetic Wall Plates, Decorative Wall Plates, RQ Home," http://www.rqhome.com/wall-plate-decor/metal-switch-plates.html, 3 pages, printed Jul. 23, 2015.
Honeywell, "TotalHome Energy Management System 2000, Specification Data," 2 pages, 1996. (Applicant points out, in accordance with MPEP 609.04(a), that the year of publication, 1996 is sufficiently earlier than the effective U.S. filing date, so that the particular month of publication is not in issue.).
Honeywell Cannon Technologies Alliance, "Programmable Load Management Thermostat Weekday/Weekend (5-day/Saturday/Sunday) T7512A,B, User's Guide," 32 pages, 2002. (Applicant points out, in accordance with MPEP 609.04(a), that the year of publication, 2002 is sufficiently earlier than the effective U.S. filing date, so that the particular month of publication is not in issue.).
Honeywell Cannon Technologies Alliance, "T7512A,B Programmable Load Management Thermostat, Installation Instructions," 8 pages, 2002. (Applicant points out, in accordance with MPEP 609.04(a), that the year of publication, 2002 is sufficiently earlier than the effective U.S. filing date, so that the particular month of publication is not in issue.).
Honeywell, "CM907 Programmable Thermostat, Product Specification Sheet," Honeywell Control Systems Limited, 7 pages, Sep. 2006. (Applicant points out, in accordance with MPEP 609.04(a), that the year of publication, 2006 is sufficiently earlier than the effective U.S. filing date, so that the particular month of publication is not in issue.).
Honeywell, "Excel Building Supervisor-Integrated R7044 and FS90 Ver. 2.0," Operator Manual, 74-1268, 72 pages Apr. 1995. (Applicant points out, in accordance with MPEP 609.04(a), that the year of publication, 1995 is sufficiently earlier than the effective U.S. filing date, so that the particular month of publication is not in issue.).
Honeywell, "Programmable Load Controller Weekday/Weekend (5-day/Saturday/Sunday) Programmable Heat and/or Cool Conventional and Heat Pump T7512A,B,C, User's Guide," 32 pages, 1996. (Applicant points out, in accordance with MPEP 609.04(a), that the year of publication, 1996 is sufficiently earlier than the effective U.S. filing date, so that the particular month of publication is not in issue.).
Honeywell, "R4525A Load Relay Module, Installation Instructions," 69-0857-1, 4 pages, 1995. (Applicant points out, in accordance with MPEP 609.04(a), that the year of publication, 1995 is

(56) References Cited

OTHER PUBLICATIONS sufficiently earlier than the effective U.S. filing date, so that the particular month of publication is not in issue.).

Honeywell, "T7512A,B,C,D Programmable Load Controller, Installation Instructions," 69-0988-1, 8 pages, 1997. (Applicant points out, in accordance with MPEP 609.04(a), that the year of publication, 1997 is sufficiently earlier than the effective U.S. filing date, so that the particular month of publication is not in issue.).

Honeywell, "T7525/T7526 Thermostat Touchpad, User Guide," TotalHome, 16 pages, 1995. (Applicant points out, in accordance with MPEP 609.04(a), that the year of publication, 1995 is sufficiently earlier than the effective U.S. filing date, so that the particular month of publication is not in issue.).

Honeywell, "TotalHome Energy Management System 2000," TotalHome, 12 pages, 1995. (Applicant points out, in accordance with MPEP 609.04(a), that the year of publication, 1995 is sufficiently earlier than the effective U.S. filing date, so that the particular month of publication is not in issue.).

Honeywell, "W8525A,B,C,D Control Module, Installation Instructions," 69-0985, 8 pages, 1995. (Applicant points out, in accordance with MPEP 609.04(a), that the year of publication, 1995, is sufficiently earlier than the effective U.S. filing date, so that the particular month of publication is not in issue.).

"Download Free Muscle Car Theme for IOS4.0," accessed from http://lhemes.mob.org,/gallery/134346/, 2 pages printed Jul. 16, 2015.

What is Desktop Theme? Definition From Whatis.com, "accessed from http://searchenterprisedesktop.techtarget.com/definition/desktop-theme," 5 pages, printed Jul. 16, 2015.

"Community Showcase: Natural Landscapes 3 Theme—Microsoft Windows," http://windows.microsoft.com/en-us/windows/community-showcase-landscapes-3-download-theme, 1 page, printed Jul. 16, 2015.

"How do I mount my Arlo cameras," https://community.netgear.com/t5/Arlo-Knowledge-Base/How-do-I-mount-my-Arlo-cameras/ta-p/999, NETGEAR Communities, 4 pages, printed Jul. 23, 2015.

I-Stat, "Installation and Operation Manual, for Low Voltage (24VAC) Systems Only," 14 pages, Nov. 2002.

LightStat, "Model RTPstat Thermostat," accessed from http://www.lightstat.com 2 pages, prior to Jun. 28, 2007.

LuxPro "PSD122E, Installation and Operating Instructions," 6 pages, prior to Jun. 28, 2007.

LuxPro, "PSP722E Everything Stat," 2 pages, prior to Jun. 28, 2007.

SmartWay Solutions, Inc., "The Talking Thermostat, User's Guide," 2 pages, downloaded Jul. 16, 2015.

"Maingate Home," Comverge, accessed from http://www.comverge.com/printer.cfm on or about May 22, 2007, 1 page.

"EMi—Carrier's Internet Communicating Programmable Thermostat,", Carrier, accessed from http://www.comfortchoice.carrier.com/details accessed on or about May 22, 2007, 1 pp.

"Carrier System Elements and Hardware," Carrier, accessed from http://www.comfortchoice.carrier.com/details on or about May 22, 2007, 1 pp.

Trane, "Creating Input/Output Objects," BMTW-SVP01D-EN, The American Standard Company, Nov. 2001, 196 pp.

"Controlling Your Nest Learning Thermostat from the Nest App or the Web," Nest Support, accessed from https://nest.com/support/article/Controlling-your-Nest-Learning-Thermostatfrom-the-Nest-app-or-the-Web accessed on or about May 13, 2015, 14 pages.

Trane, "Using the Graphing Control Editor," The American Standard Company, Nov. 2001, 181 pp.

http://www.lightstat.com/products/utility.asn, "Lightstat Products for Utility Demand Response and Load Curtailment Programs," 2 pages, printed May 22, 2007.

http://www.comfortchoice.carrier.com/details printable, "Carrier How Does it Work?", 1 page, printed May 22, 2007.

"The Thermostat of Choice for HVAC Automation," Aprilaire Communicating Thermostat, accessed from http://www.smarthome.com/3020t.html, on or about May 16, 2007, 4 pages.

European Response to Communication dated Jan. 22, 2019 for corresponding Application Serial No. 17746337.9 filed on Aug. 19, 2019 (18 pp).

\* cited by examiner

GEOFENCE PLUS SCHEDULE FOR A BUILDING CONTROLLER

TECHNICAL FIELD

The present disclosure pertains to building control systems such as Heating, Ventilation, and/or Air Conditioning (HVAC) systems, security systems, lighting systems and the like. More particularly, the present disclosure pertains to methods and systems for controlling such building control systems.

BACKGROUND

Building control systems are used to control conditions within a building or other structure. Example building control systems include HVAC systems, security systems, and lighting systems. HVAC systems, for example, are often used to control the comfort level within a building or other structure. In some cases, and to save energy, an HVAC controller may be configure to control to a more energy efficient setpoint when the building is expected to be unoccupied than when the building is expected to be occupied. In some instances, geofencing may be used to determine if the building is occupied or unoccupied. If the building is determined to be occupied, the HVAC controller may control to an occupied setpoint, and if the building is determined to be unoccupied, the HVAC controller may control to an unoccupied setpoint. What would be desirable is to provide additional control options when the building is determined to be occupied.

SUMMARY

The present disclosure pertains to building control systems such as Heating, Ventilation, and/or Air Conditioning (HVAC) systems, security systems, lighting systems and the like. More particularly, the present disclosure pertains to methods and systems for controlling such building control systems.

In a particular example of the disclosure, a method of operating a building controller that is configured to control one or more building systems in combination with a mobile device that has location services includes identifying if the mobile device is inside a geofence or outside the geofence. In some cases, and if the mobile device is identified to be outside the geofence, the building controller may control at least one building system in accordance with an AWAY setting. If the mobile device is identified to be inside the geofence, the building controller may control the at least one building system in accordance with a current time in conjunction with a time-based HOME schedule, wherein the time-based HOME schedule includes two or more time periods each with a corresponding HOME setting. When the current time is in one of the two or more time periods of the time-based HOME schedule, the building controller controls the at least one building system in accordance with the corresponding HOME setting. This may be considered as combining geofencing and time based scheduling.

In another example of the disclosure, a method of operating an HVAC controller that is configured to control one or more HVAC components of a building in combination with a mobile device that has location services includes identifying if the mobile device is inside a geofence or outside the geofence. In some cases, and if the mobile device is identified to be outside the geofence, at least one HVAC component of the building may be controlled in accordance with an AWAY setting that sets one or more HVAC parameters for use when the building is unoccupied. If the mobile device is identified to be inside the geofence, the at least one HVAC component of the building may be controlled in accordance with a time-based HOME schedule, wherein the time-based HOME schedule includes two or more time periods each with a corresponding HOME setting, wherein the HOME setting for a first one of the two or more time periods is different from the HOME setting for a second one of the two or more time periods.

In another example of the disclosure, a method of operating a building controller that is configured to control one or more building systems in combination with a plurality of mobile devices that each have location services includes identifying if each of the plurality of mobile devices is inside a corresponding geofence or outside the corresponding geofence. In some cases, if all of the plurality of mobile devices are identified to be outside their corresponding geofence, the building controller may control at least one building system in accordance with an AWAY setting. If one or more of the plurality of mobile devices are identified to be inside their corresponding geofence, the building controller may control the at least one building system in accordance with a time-based HOME schedule, wherein the time-based HOME schedule includes two or more time periods each with a corresponding HOME setting.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE FIGURES

The disclosure may be more completely understood in consideration of the following description of various illustrative embodiments of the disclosure in connection with the accompanying drawings, in which.

Figure 1:
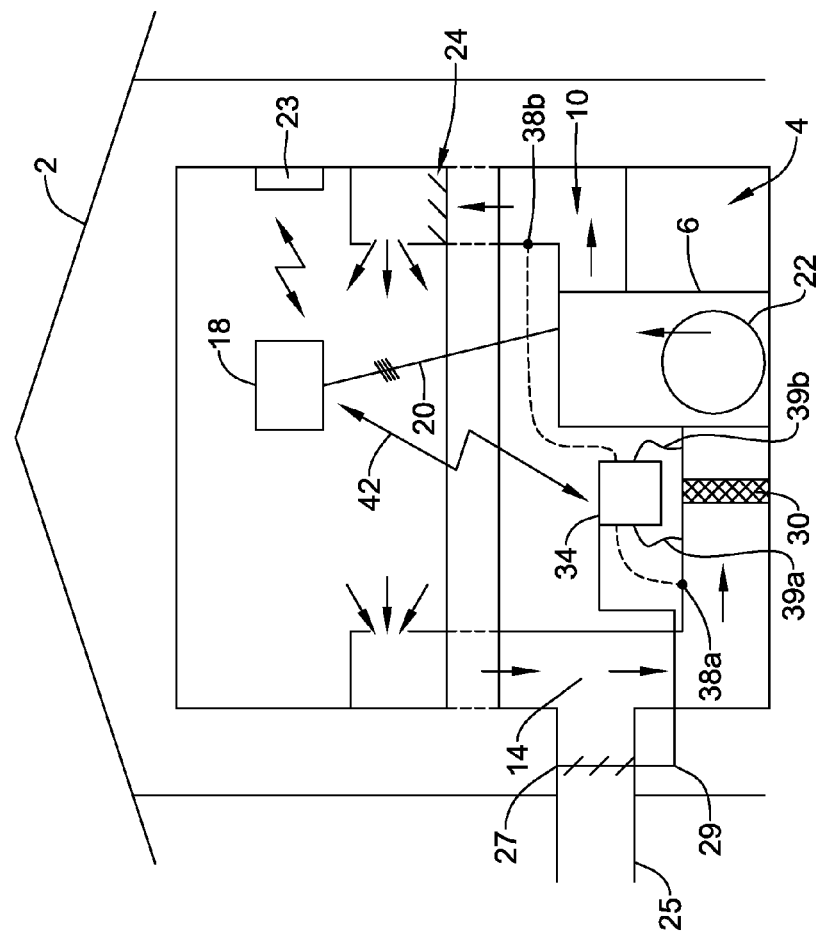
FIG. 1 is a schematic view of an illustrative HVAC system servicing a building or structure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DESCRIPTION

For the following defined terms, these definitions shall be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include one or more particular features, structures, and/or characteristics. However, such recitations do not necessarily mean that all embodiments include the particular features, structures, and/or characteristics. Additionally, when particular features, structures, and/or characteristics are described in connection with one embodiment, it should be understood that such features, structures, and/or characteristics may also be used connection with other embodiments whether or not explicitly described unless clearly stated to the contrary.

The present disclosure is directed generally at building automation systems. Building automation systems are systems that control one or more operations of a building. Building automation systems can include HVAC systems, security systems, fire suppression systems, energy management systems and other systems. While HVAC systems with HVAC controllers are used as an example below, it should be recognized that the concepts disclosed herein can be applied to building automation systems more generally.

FIG. 1 is a schematic view of a building 2 having an illustrative heating, ventilation, and air conditioning (HVAC) system 4. While FIG. 1 shows a typical forced air type HVAC system, other types of HVAC systems are contemplated including, but not limited to, boiler systems, radiant heating systems, electric heating systems, cooling systems, heat pump systems, and/or any other suitable type of HVAC system, as desired. The type of HVAC system and/or the particular HVAC equipment used may depend on the geographic region. For example, natural gas fired forced air furnaces may be more common in the northern regions of the Unites States, while electric heat may be more common in the southwest. Boiler systems may be more common in the northeast region of the United States, as well as in Europe. These are just some examples.

The illustrative forced air type HVAC system 4 of FIG. 1 includes one or more HVAC components 6, a system of ductwork and air vents including a supply air duct 10 and a return air duct 14, and one or more HVAC controllers 18. The one or more HVAC components 6 may include, but are not limited to, a furnace, a heat pump, an electric heat pump, a geothermal heat pump, an electric heating unit, an air conditioning unit, a humidifier, a dehumidifier, an air exchanger, an air cleaner, a damper, a valve, and/or the like.

It is contemplated that the HVAC controller(s) 18 may be configured to control the comfort level in the building or structure by activating and deactivating the HVAC component(s) 6 in a controlled manner. The HVAC controller(s) 18 may be configured to control the HVAC component(s) 6 via a wired or wireless communication link 20. In some cases, the HVAC controller(s) 18 may be a thermostat, such as, for example, a wall mountable thermostat, but this is not required in all embodiments. Such a thermostat may include (e.g. within the thermostat housing) or have access to one or more temperature sensor(s) for sensing ambient temperature at or near the thermostat. In some instances, the HVAC controller(s) 18 may be a zone controller, or may include multiple zone controllers each monitoring and/or controlling the comfort level within a particular zone in the building or other structure.

In the illustrative HVAC system 4 shown in FIG. 1, the HVAC component(s) 6 may provide heated air (and/or cooled air) via the ductwork throughout the building 2. As illustrated, the HVAC component(s) 6 may be in fluid communication with every room and/or zone in the building 2 via the ductwork 10 and 14, but this is not required. In operation, when a heat call signal is provided by the HVAC controller(s) 18, an HVAC component 6 (e.g. forced warm air furnace) may be activated to supply heated air to one or more rooms and/or zones within the building 2 via supply air ducts 10. The heated air may be forced through supply air duct 10 by a blower or fan 22. In this example, the cooler air from each zone may be returned to the HVAC component 6 (e.g. forced warm air furnace) for heating via return air ducts 14. Similarly, when a cool call signal is provided by the HVAC controller(s) 18, an HVAC component 6 (e.g. air conditioning unit) may be activated to supply cooled air to one or more rooms and/or zones within the building or other structure via supply air ducts 10. The cooled air may be forced through supply air duct 10 by the blower or fan 22. In this example, the warmer air from each zone may be returned to the HVAC component 6 (e.g. air conditioning unit) for cooling via return air ducts 14. In some cases, the HVAC system 4 may include an internet gateway or other device 23 that may allow one or more of the HVAC components, as described herein, to communicate over a wide area network (WAN) such as, for example, the Internet.

In some cases, the system of vents or ductwork 10 and/or 14 can include one or more dampers 24 to regulate the flow of air, but this is not required. For example, one or more dampers 24 may be coupled to one or more HVAC controller(s) 18, and can be coordinated with the operation of one or more HVAC components 6. The one or more HVAC controller(s) 18 may actuate dampers 24 to an open position, a closed position, and/or a partially open position to modulate the flow of air from the one or more HVAC components to an appropriate room and/or zone in the building or other structure. The dampers 24 may be particularly useful in zoned HVAC systems, and may be used to control which zone(s) receives conditioned air from the HVAC component(s) 6.

In many instances, one or more air filters 30 may be used to remove dust and other pollutants from the air inside the building 2. In the illustrative example shown in FIG. 1, the air filter(s) 30 is installed in the return air duct 14, and may filter the air prior to the air entering the HVAC component 6, but it is contemplated that any other suitable location for the air filter(s) 30 may be used. The presence of the air filter(s) 30 may not only improve the indoor air quality, but may also protect the HVAC components 6 from dust and other particulate matter that would otherwise be permitted to enter the HVAC component.

In some cases, and as shown in FIG. 1, the illustrative HVAC system 4 may include an equipment interface module (EIM) 34. When provided, the equipment interface module 34 may, in addition to controlling the HVAC under the direction of the thermostat, be configured to measure or detect a change in a given parameter between the return air side and the discharge air side of the HVAC system 4. For example, the equipment interface module 34 may measure a difference in temperature, flow rate, pressure, or a combination of any one of these parameters between the return air side and the discharge air side of the HVAC system 4. In some cases, the equipment interface module 34 may be adapted to measure the difference or change in temperature (delta T) between a return air side and discharge air side of the HVAC system 4 for the heating and/or cooling mode. The delta T for the heating and cooling modes may be calculated by subtracting the return air temperature from the discharge air temperature (e.g. delta T=discharge air temperature−return air temperature).

In some cases, the equipment interface module 34 may include a first temperature sensor 38a located in the return (incoming) air duct 14, and a second temperature sensor 38b located in the discharge (outgoing or supply) air duct 10. Alternatively, or in addition, the equipment interface module 34 may include a differential pressure sensor including a first pressure tap 39a located in the return (incoming) air duct 14, and a second pressure tap 39b located downstream of the air filter 30 to measure a change in a parameter related to the amount of flow restriction through the air filter 30. In some cases, the equipment interface module 34, when provided, may include at least one flow sensor that is capable of providing a measure that is related to the amount of air flow restriction through the air filter 30. In some cases, the equipment interface module 34 may include an air filter monitor. These are just some examples.

When provided, the equipment interface module 34 may be configured to communicate with the HVAC controller 18 via, for example, a wired or wireless communication link 42. In other cases, the equipment interface module 34 may be incorporated or combined with the HVAC controller 18. In some instances, the equipment interface module 34 may communicate, relay or otherwise transmit data regarding the selected parameter (e.g. temperature, pressure, flow rate, etc.) to the HVAC controller 18. In some cases, the HVAC controller 18 may use the data from the equipment interface module 34 to evaluate the system's operation and/or performance. For example, the HVAC controller 18 may compare data related to the difference in temperature (delta T) between the return air side and the discharge air side of the HVAC system 4 to a previously determined delta T limit stored in the HVAC controller 18 to determine a current operating performance of the HVAC system 4.

In some cases, the HVAC system 4 may include ventilation. There are a number of different types of ventilation systems. Examples include passive ventilation or mechanical ventilation. Mechanical ventilation may, for example, include an actuatable damper 27 that may be disposed within a duct 25 and connected to the return air duct 14. When the damper 27 is open, fresh air from outside may be pulled into the return air duct 14 and thus into the building 2. In some cases, the actuatable damper 27 may be connected via a control line 29 to the EIM 34. It will be appreciated that additional examples of mechanical ventilation include an ERV (energy recovery ventilator) or an HRV (heat recovery ventilator).

Figure 2:
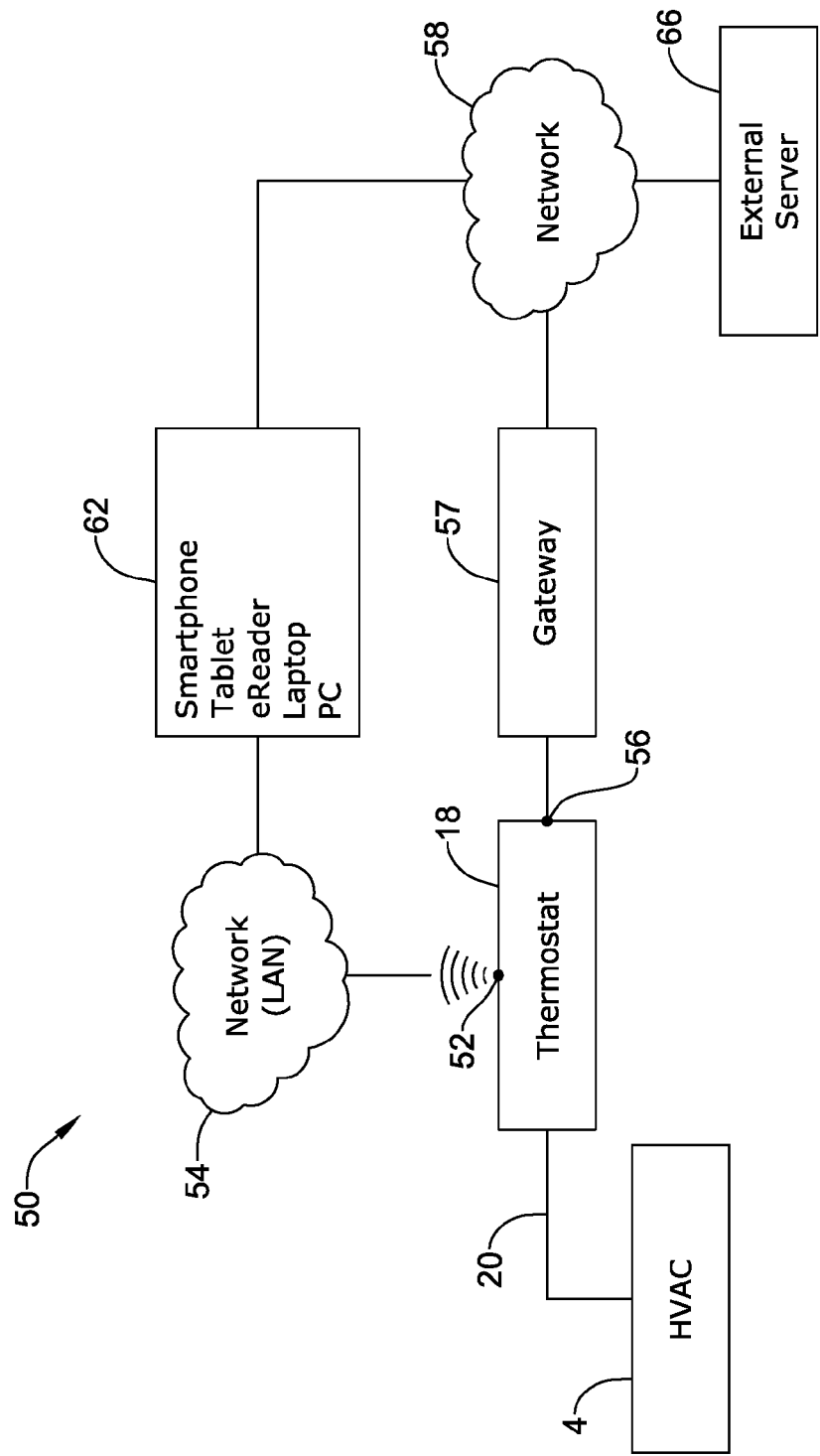
FIG. 2 is a schematic view of an illustrative HVAC control system that may facilitate access and/or control of the HVAC system of FIG. 1.

FIG. 2 is a schematic view of an illustrative HVAC control system 50 that facilitates remote access and/or control of the illustrative HVAC system 4 shown in FIG. 1. The HVAC control system 50 may be considered a building automation system or part of a building automation system. The illustrative HVAC control system 50 includes an HVAC controller, as for example, HVAC controller 18 (see FIG. 1) that is configured to communicate with and control one or more HVAC components 6 of the HVAC system 4. As discussed above, the HVAC controller 18 may communicate with the one or more HVAC components 6 of the HVAC system 4 via a wired or wireless link 20. Additionally, the HVAC controller 18 may communicate over one or more wired or wireless networks that may accommodate remote access and/or control of the HVAC controller 18 via another device such as a smart phone, tablet, e-reader, laptop computer, personal computer, key fob, or the like. As shown in FIG. 2, the HVAC controller 18 may include a first communications port 52 for communicating over a first network 54, and in some cases, a second communications port 56 for communicating over a second network 58. In some cases, communications over a second network 58 may pass through a gateway 57, but this is not required in all cases. In some cases, the first network 54 may be a wireless local area network (LAN), and the second network 58 (when provided) may be a wide area network or global network (WAN) including, for example, the Internet. In some cases, the wireless local area network 54 may provide a wireless access point and/or a network host device that is separate from the HVAC controller 18. In other cases, the wireless local area network 54 may provide a wireless access point and/or a network host device that is part of the HVAC controller 18. In some cases, the wireless local area network 54 may include a local domain name server (DNS), but this is not required for all embodiments. In some cases, the wireless local area network 54 may be an ad-hoc wireless network, but this is not required.

In some cases, the HVAC controller 18 may be programmed to communicate over the second network 58 with an external web service hosted by one or more external web server(s) 66. A non-limiting example of such an external web service is Honeywell's TOTAL CONNECT™ web service. The HVAC controller 18 may be configured to upload selected data via the second network 58 to the external web service where it may be collected and stored on the external web server 66. In some cases, the data may be indicative of the performance of the HVAC system 4. Additionally, the HVAC controller 18 may be configured to receive and/or download selected data, settings and/or services sometimes including software updates from the external web service over the second network 58. The data, settings and/or services may be received automatically from the web service, downloaded periodically in accordance with a control algorithm, and/or downloaded in response to a user request. In some cases, for example, the HVAC controller 18 may be configured to receive and/or download an HVAC operating schedule and operating parameter settings such as, for example, temperature setpoints, humidity setpoints, start times, end times, schedules, window frost protection settings, and/or the like from the web server 66 over the second network 58. In some instances, the HVAC controller 18 may be configured to receive one or more user profiles having at least one operational parameter setting that is selected by and reflective of a user's preferences. In still other instances, the HVAC controller 18 may be configured to receive and/or download firmware and/or hardware updates such as, for example, device drivers from the web server 66 over the second network 58. Additionally, the HVAC controller 18 may be configured to receive local weather data, weather alerts and/or warnings, major stock index ticker data, traffic data, and/or news headlines over the second network 58. These are just some examples.

Depending upon the application and/or where the HVAC user is located, remote access and/or control of the HVAC controller 18 may be provided over the first network 54 and/or the second network 58. A variety of remote wireless devices 62 may be used to access and/or control the HVAC controller 18 from a remote location (e.g. remote from the HVAC Controller 18) over the first network 54 and/or second network 58 including, but not limited to, mobile phones including smart phones, tablet computers, laptop or personal computers, wireless network-enabled key fobs, e-readers, and/or the like. In many cases, the remote wireless devices 62 are configured to communicate wirelessly over the first network 54 and/or second network 58 with the HVAC controller 18 via one or more wireless communication protocols including, but not limited to, cellular communication, ZigBee, REDLINK™, Bluetooth, WiFi, IrDA, dedicated short range communication (DSRC), EnOcean, and/or any other suitable common or proprietary wireless protocol, as desired.

In some cases, an application program code (i.e. app) stored in the memory of the remote device 62 may be used to remotely access and/or control the HVAC controller 18. The application program code (app) may be downloaded from an external web service, such as the web service hosted by the external web server 66 (e.g. Honeywell's TOTAL CONNECT™ web service) or another web service (e.g. ITUNES® or Google Play). In some cases, the app may provide a remote user interface for interacting with the HVAC controller 18 at the user's remote device 62. For example, through the user interface provided by the app, a user may be able to change operating parameter settings such as, for example, temperature setpoints, humidity setpoints, start times, end times, schedules, window frost protection settings, accept software updates and/or the like. Communications may be routed from the user's remote device 62 to the web server 66 and then, from the web server 66 to the HVAC controller 18. In some cases, communications may flow in the opposite direction such as, for example, when a user interacts directly with the HVAC controller 18 to change an operating parameter setting such as, for example, a schedule change or a setpoint change. The change made at the HVAC controller 18 may be routed to the web server 66 and then from the web server 66 to the remote device 62 where it may reflected by the application program executed by the remote device 62.

In some cases, a user may be able to interact with the HVAC controller 18 via a user interface provided by one or more web pages served up by the web server 66. The user may interact with the one or more web pages using a variety of internet capable devices to effect a setting or other change at the HVAC controller 18, and in some cases view usage data and energy consumption data related to the usage of the HVAC system 4. In some cases, communication may occur between the user's remote device 62 and the HVAC controller 18 without being relayed through a server such as external server 66. These are just some examples.

Figure 3:
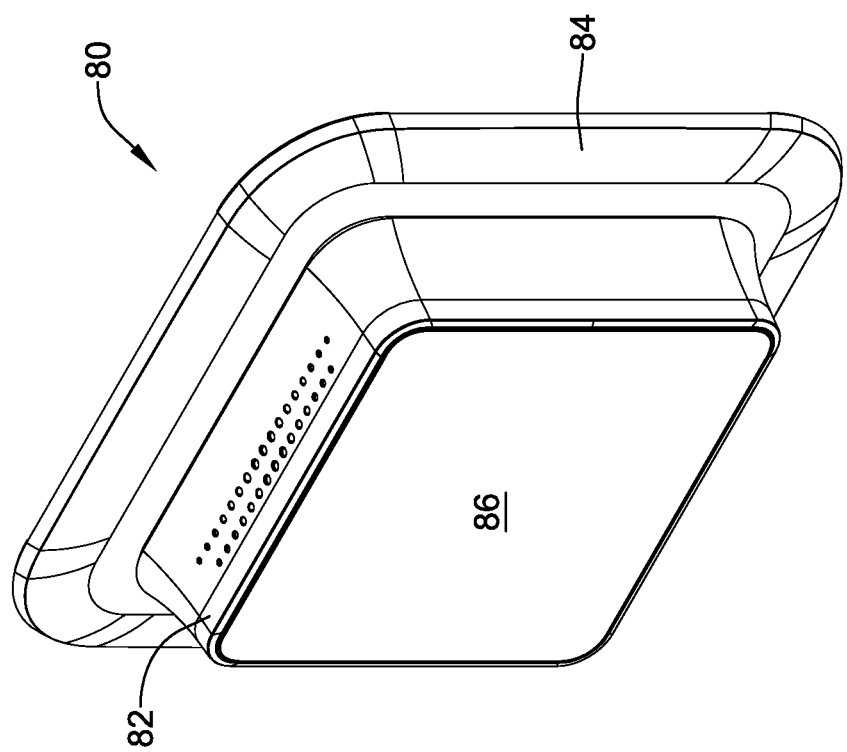
FIG. 3 is a perspective view of an illustrative thermostat assembly that may be used in the HVAC system of FIG. 1 or FIG. 2.

FIG. 3 is a perspective view of an illustrative thermostat assembly 80. In some instances, the thermostat assembly 80 may be considered as an example of the HVAC controller 18 referenced in FIGS. 1 and 2. In some instances, the thermostat assembly 80 may include a thermostat 82 and a trim piece 84. The thermostat 82 may include a user interface 86 which, in some cases, may be a touch screen display such as a fixed segment touch screen display or a dot matrix touch screen display. It will be appreciated that if the user interface 86 is a fixed segment touch screen display, the ability of the thermostat 82 to rearrange what is displayed on the user interface 86 may be somewhat limited. In some cases, it will be appreciated that a touch screen display may, for example, have any number of distinct touch points where the touch screen display is configured to sense that the touch point has been touched or is being touched. In some cases, the touch screen display may have a relatively limited number of distinct touch points in order to reduce costs, for example.

Figure 4:
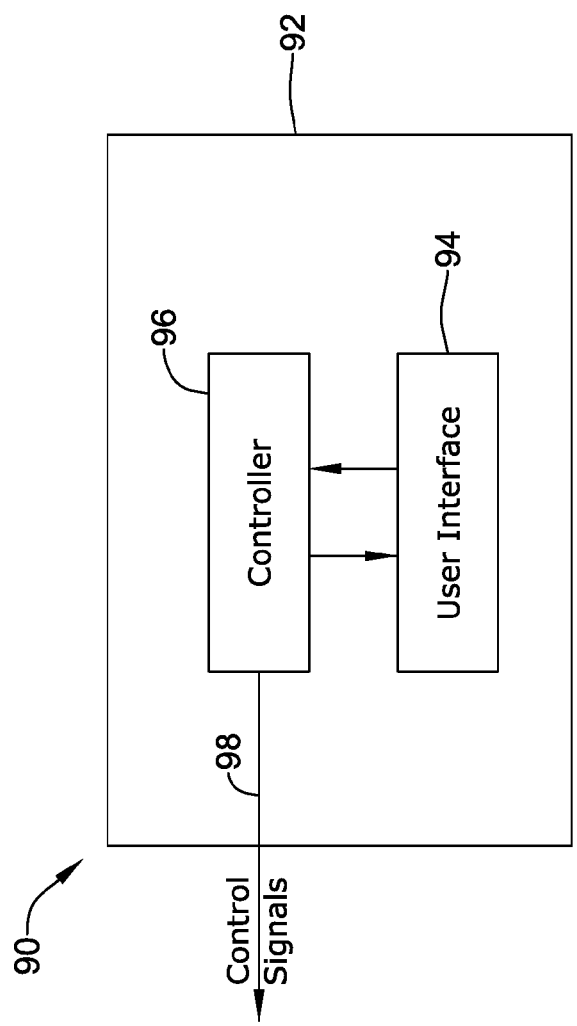
FIG. 4 is a schematic view of an illustrative HVAC controller that may, for example, form part of the HVAC system of FIG. 1 or FIG. 2.

FIG. 4 is a schematic view of an illustrative HVAC controller 90 that may, for example, be configured to control one or more HVAC components (such as but not limited to the HVAC component(s) 6 shown in FIG. 1 as part of the HVAC system 4) in accordance with one or more comfort parameters that define desired temperatures for particular time periods. In some cases, the HVAC controller 90 may utilize geofencing in controlling operation of the HVAC system 4 or portions thereof. In geofencing, a user may, for example, set one or more HOME comfort parameters that the HVAC controller 90 can use in controlling the HVAC system 4 when someone is home and one or more AWAY comfort parameters that the HVAC controller 90 can use in controlling the HVAC system 4 when the home is unoccupied. In some cases, one or more HOME comfort settings and/or on or more AWAY comfort parameters may be set by the user using the user interface 94 of the HVAC controller 90. In some cases, as will be discussed, the user may set or edit one or more HOME comfort settings and/or on or more AWAY comfort parameters utilizing a mobile device such as a smartphone, for example. Comfort parameters may include a heating temperature setpoint, a cooling temperature setpoint, ventilation setting, humidification and/or dehumidification settings, and/or any other suitable parameters or settings. In some cases, geofencing relies upon knowing the location of each user's mobile device (such as but not limited to a smartphone) relative to a pre-defined geofence boundary disposed about the home to determine if the home is occupied or unoccupied.

In some cases, the HVAC controller 90 may operate in accordance with a programmable schedule. The programmable schedule may include a plurality of schedule time periods. For example, in some cases, the programmable schedule may include four different time periods for each day. These four time periods may be identified as WAKE, AWAY, HOME and SLEEP. In some instances, the programmable schedule may include additional time periods. In some cases, the programmable schedule may include fewer than four distinct time periods, such as only HOME and SLEEP time periods. In some cases, different days of the week may have a different number of time periods.

In some instances, the programmable schedule may be known as a 7 day schedule, in which each of the seven days of the week may be uniquely programmed but are not required to be. In some cases, the programmable schedule may be known as a 5-2 schedule, in which each of the weekdays Monday through Friday share a first programmable schedule and the weekend days Saturday and Sunday share a second programmable schedule. In some cases, the programmable schedule may be known as a 5-1-1 schedule, in each of the weekdays Monday through Friday share a first programmable schedule, and Saturday and Sunday each can have their own unique schedule.

In some cases, a user may elect to use geofencing in conjunction with a time-based schedule. For example, geofencing may be used to determine if the building is occupied or unoccupied. If the building is determined to be unoccupied via geofencing, the HVAC controller may control to an unoccupied setpoint. If the building is determined to be occupied via geofencing, the HVAC controller may control in accordance with a time-based schedule.

In some cases, a user may decide not to use geofencing or a programmable schedule, but instead may elect to operate their HVAC controller in a manual mode. In a manual mode, the user would simply select a heating temperature setpoint for a heating mode and a cooling temperature setpoint for a cooling mode. If they are cold in the heating mode, the user could manually bump up the heating temperature setpoint a few degrees. If they are hot in the cooling mode, the user could manually drop the cooling temperature setpoint a few degrees.

In some cases, the HVAC controller 90 may include a housing 92. In some instances, the housing 92 may be considered as forming the outer structure of the thermostat 82 (FIG. 3), although this is not required in all cases. A user interface 94 may be housed by the housing 92 in such a way as to be accessible from outside of the housing 92. In some cases, for example, the user interface 94 may form a portion of an outer surface, such as the front of the outer surface, of the housing 92. In some cases, the user interface 94 may be a touch screen display. In some instances, the user interface 94 may be a fixed segment touch screen display, and may for example have a limited number of distinct touch points. In some cases, the user interface 94 may be a dot matrix touch screen display, and in some cases essentially an entire surface of the a dot matrix touch screen display 94 may provide touch points.

The illustrative HVAC controller 90 includes a controller 96 that may be configured to operate an algorithm that at least partially controls the HVAC system of the building, and outputs one or more control signals 98 to the HVAC system. In some cases, the algorithm may reference or otherwise utilize a plurality of equipment setup parameters that setup the algorithm to control the particular HVAC equipment that is used in the HVAC system of the building. These equipment setup parameters may, for example, be defined and parameter values for these equipment setup parameters may be entered during an initial configuration of the HVAC controller 90. In some cases, the algorithm may also reference or otherwise utilize one or more comfort parameters that define one or more comfort setpoints used by the algorithm when controlling the at least part of the HVAC system of the building.

Figure 5:
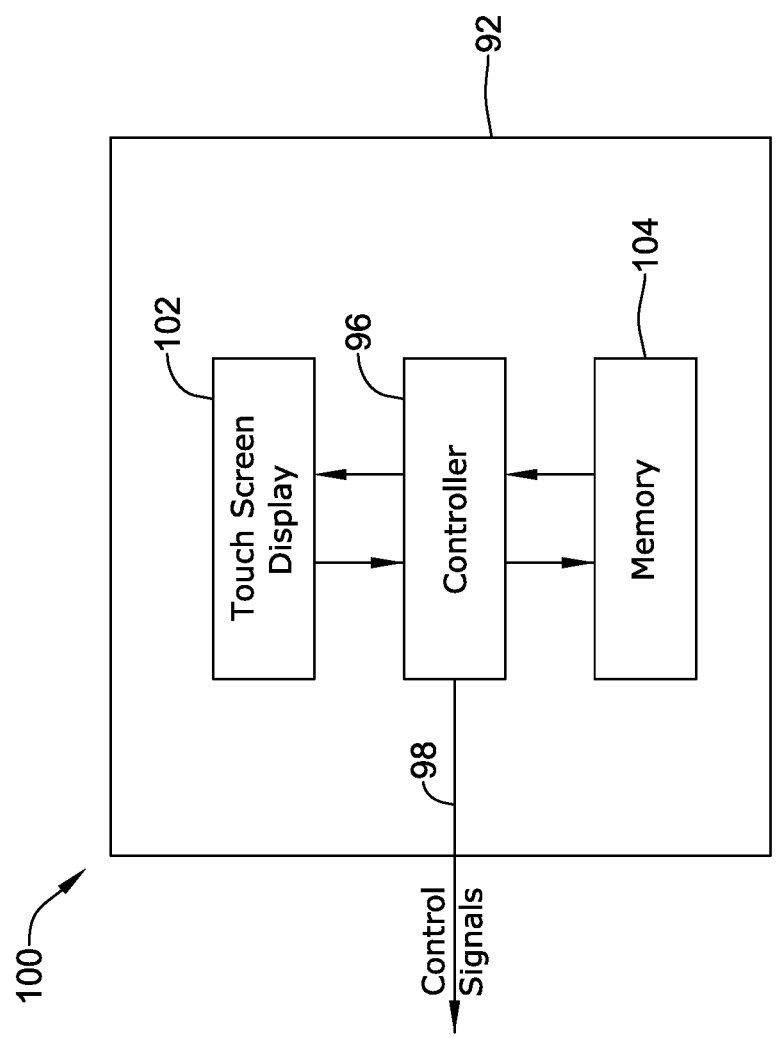
FIG. 5 is a schematic view of an illustrative HVAC controller that may, for example, form part of the HVAC system of FIG. 1 or FIG. 2.

FIG. 5 is a schematic view of an illustrative HVAC controller 100 that may, for example, be configured to control one or more HVAC components (such as but not limited to the HVAC component(s) 6 shown in FIG. 1 as part of the HVAC system 4. In some cases, the HVAC controller 100 may be considered as including any or all of the functionality described with respect to the HVAC controller 90, and vice versa. In some cases, the HVAC controller 100 may include a housing 92. In some instances, the housing 92 may be considered as forming the outer structure of the thermostat 82 (FIG. 3), although this is not required in all cases. A touch screen display 102 may be housed by the housing 92 in such a way as to be accessible from outside of the housing 92. In some cases, for example, the touch screen display 102 may form a portion of an outer surface, such as the front of the outer surface, of the housing 92. In some cases, the touch screen display 102 may be a fixed segment touch screen display, and may for example have a limited number of distinct touch points. In some cases, the touch screen display 102 may be a dot matrix touch screen display, and in some cases essentially an entire surface of the touch screen display 102 may provide touch points.

The illustrative HVAC controller 100 includes the controller 96 that may be configured to operate an algorithm that at least partially controls the HVAC system of the building, and outputs one or more control signals 98 to the HVAC system. In some cases, the algorithm may reference or otherwise utilize a plurality of equipment setup parameters that setup the algorithm to control the particular HVAC equipment that is used in the HVAC system of the building. These equipment setup parameters may, for example, be defined and parameter values for these equipment setup parameters may be entered during an initial configuration of the HVAC controller 90. In some cases, the algorithm may also reference or otherwise utilize one or more comfort parameters that define one or more comfort setpoints used by the algorithm when controlling the at least part of the HVAC system of the building.

The HVAC controller 100 may include a memory 104 in order to store a plurality of equipment setup parameters that setup the HVAC controller to control the particular HVAC equipment that is used in the HVAC system of the building as well as one or more comfort parameters that define one or more comfort setpoints used by the HVAC controller when controlling the at least part of the HVAC system of the building. In some cases, the controller 96 may be operably coupled to the touch screen display 102 and to the memory 104. The controller 96 may be configured to control at least a portion of the HVAC system based at least in part on the plurality of equipment setup parameters.

Figure 6:
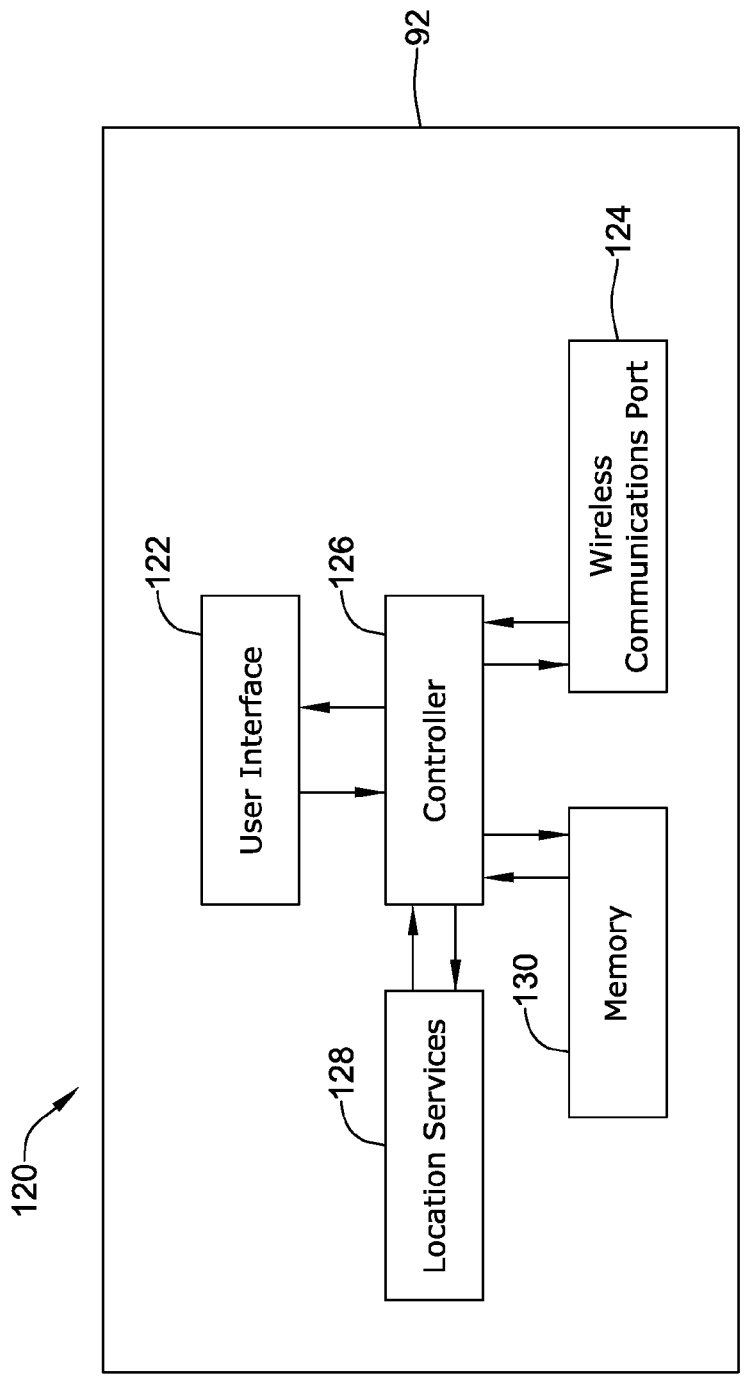
FIG. 6 is a schematic view of an illustrative mobile device that may, for example, be used in combination with the HVAC system of FIG. 1 or FIG. 2.

FIG. 6 is a schematic view of a mobile device 120 that may be used to facilitate operation of an HVAC controller. In some instances, the mobile device 120 may be considered as being an example of the remote wireless device 62 referenced in FIG. 2. In some cases, the mobile device 120 may include a user interface 122, a wireless communication port 124 and a controller 126 that is operatively coupled to the user interface 122 and the wireless communication port 124. In some cases, the mobile device 120 may include location services 128 that is operatively coupled with the controller 126. In some cases, the controller 126 may be configured to turn the location services 128 on and/or off in order for the mobile device 120 to determine its location. In some cases, the location services 128 may include GPS functionality. In some instances, the location services 128 may include an ability to triangulate from a cellular signal. In some cases, the location services 128 may utilize Wi-Fi to assist in determining a current position of the mobile device 120. In some cases, the mobile device 120 may also include a memory 130 that is operatively coupled to the controller 126 and may, for example, store information pertaining to a geofence boundary.

In some cases, the controller 126 may be configured to obtain a current location of the mobile device 120 via the location services 128 and to compare the current location with a geofence boundary that is stored in the memory 130. The controller 126 may communicate the current location relative to the geofence boundary to a remote server such as the server 66 (FIG. 2) via the wireless communication port 124, for example. In some cases, the controller 126 may only communicate whether the mobile device 120 is inside the geofence boundary or outside the geofence boundary. In some instances, the controller 126 may only communicate information indicating that a geofence boundary crossing has occurred, and optionally may include an indication of whether the geofence boundary crossing was an incoming crossing (moving towards the home) or an outgoing crossing (moving away from the home). These are just some examples.

In some cases, the user interface 122 may include or otherwise be a touch screen display that is configured to display information from the controller 126 as well as to solicit input from the user. The wireless communication port 124 may, for example, enable the mobile device 120 to communicate wirelessly with a network 54 (FIG. 2) and thus communicate with an HVAC controller such as the thermostat 18 (FIG. 2) and/or communicate with a network 58 (FIG. 2) and thus communicate with a server such as the external server 66 (FIG. 2) that can communicate with an HVAC controller.

In some cases, the controller 126 may be configured to display on the user interface 122 one or more screens that permit a user to view and/or edit various parameters such as scheduling parameters. For example, in some cases, a user may be able to view and/or edit scheduling parameters pertaining to geofencing on their mobile device 120. In some cases, it will be appreciated that the user may also be able to view and/or edit scheduling parameters related to geofencing on the user interface 94 (FIG. 4) of their HVAC controller 90. In some cases, scheduling parameters pertaining to geofencing may include but may not be limited to one or more HOME comfort settings that the HVAC controller 90 (or the HVAC controller 100) may utilize in controlling one or more HVAC components when geofencing indicates that someone is home. In some cases, the one or more HOME comfort settings may include a first HOME comfort setting corresponding to a first period of time and a second HOME comfort setting corresponding to a second period of time that is different from the first period of time. For example, a user may want to have a HOME comfort setting that takes effect during the day (and someone is home) and a different HOME comfort setting that takes effect during the evening and overnight (and someone is home). Scheduling parameters pertaining geofencing may include but may not be limited to one or more AWAY comfort settings that the HVAC controller 90 (or the HVAC controller 100) may utilize in controlling one or more HVAC components when geofencing indicates that nobody is home. Comfort settings, include HOME comfort settings and AWAY comfort settings, may include heating temperature setpoints, cooling temperature setpoints, ventilation setpoints, humidification and/or dehumidification settings, and the like.

Figure 7:
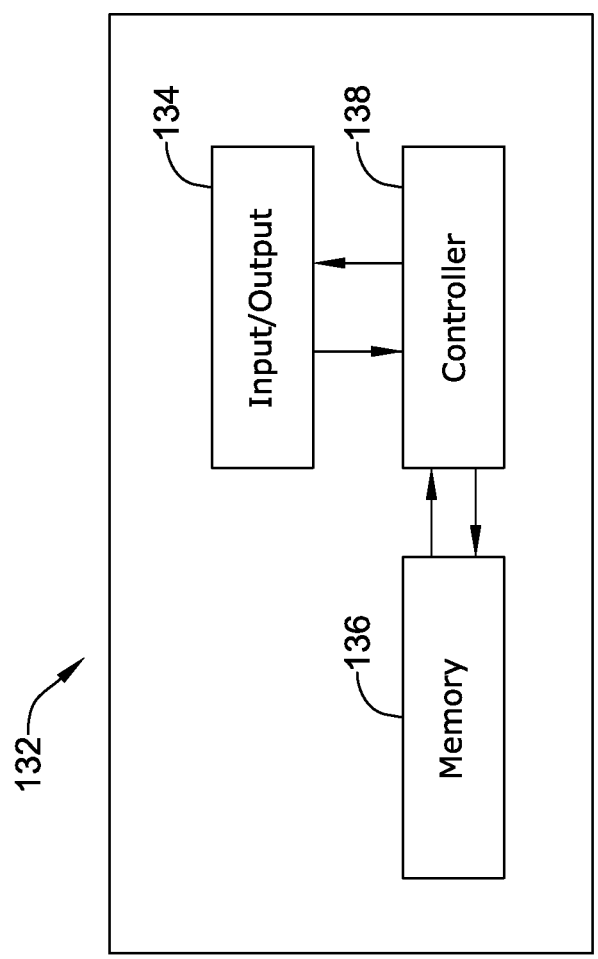
FIG. 7 is a schematic view of an illustrative server that may, for example, form part of the HVAC system of FIG. 1 or FIG. 2.

In some cases, the memory 130 of the mobile device 120 may store an application that can be run by the controller 126 of the mobile device 120 that enables the features described herein. In some cases, some functionality or software may reside partially on the mobile device 120 and partially on a server 132 schematically illustrated in FIG. 7. In some cases, the server 132 may be considered as being an example of the remote server 66 shown in FIG. 2. Referring to FIG. 7, the server 132 may include an input/output 134 by which information is sent from the server 132 to remote devices such as the mobile device 120 (FIG. 6) and/or the HVAC controller 90 (FIG. 4). In some instances, the server 132 may also receive information from remote devices such as the mobile device 120 and/or the HVAC controller 90 (or the HVAC controller 100). The illustrative server 132 also includes a memory 136 and a controller 138. The memory 136 is operably coupled to the controller 138 such that the controller 138 has access to information stored in the memory 136. It will be appreciated that the input/output 134 may also be operably coupled to the controller 138 as shown.

Figure 8:
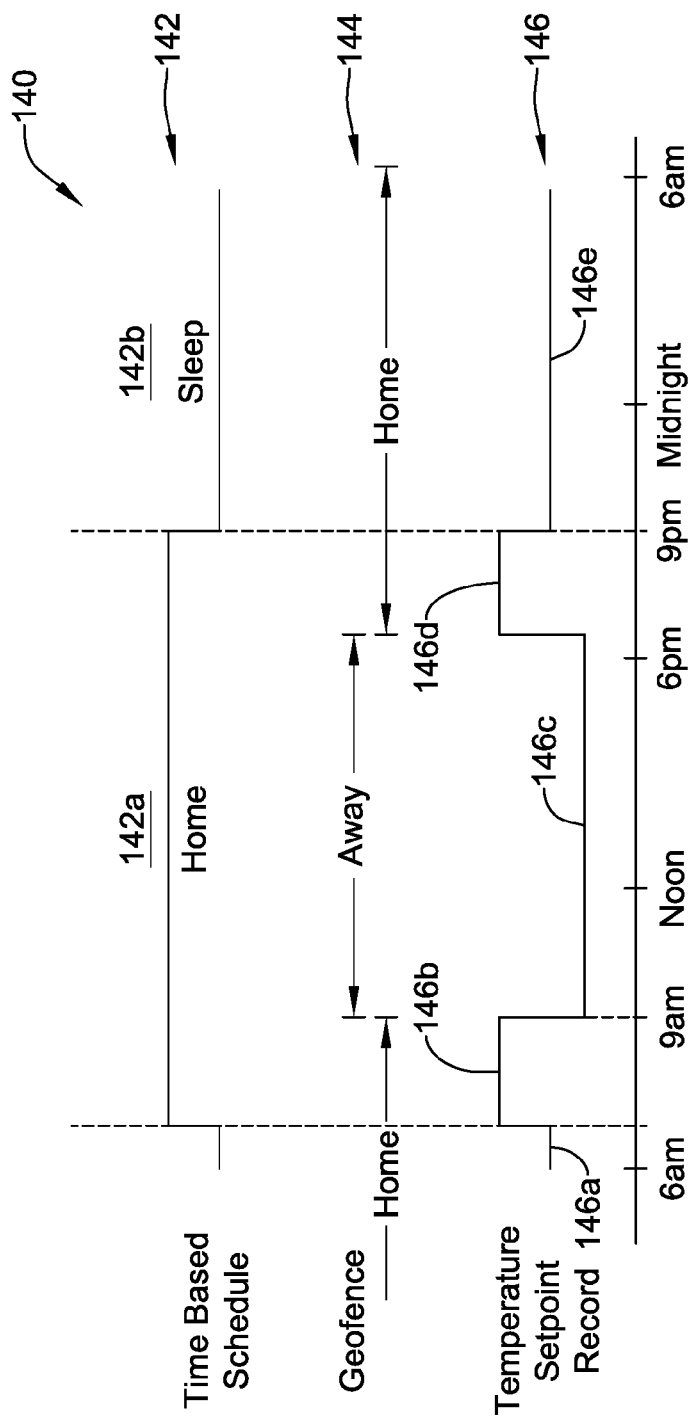
FIG. 8 is a timing diagram showing an example of using geofencing in combination with a time-based schedule.

FIG. 8 is a timing diagram showing an example of using geofencing in combination with a time-based schedule. It has been found that a time-based schedule and geofencing can work together to provide a homeowner with improved energy efficiency and comfort. FIG. 8 shows a time-based schedule 142 over time. The time-based schedule 142 includes a HOME temperature setpoint 142a that is active during a HOME time period and a SLEEP temperature setpoint 142b that is active during a SLEEP time period. The HOME temperature setpoint 142a may be followed when geofencing indicates that someone is home and the current time is within the HOME time period. As illustrated, the HOME time period extends from about 7:00 AM to about 9:00 PM. The SLEEP time period extends from about 9:00 PM to about 6:00 PM. In the example shown, the time-based schedule 142 is followed when geofencing indicates that someone is home. An AWAY temperature setpoint as shown in region 146c of a temperature setpoint record 146, which is typically more energy efficient that the HOME and SLEEP temperature setpoints 142a and 142b, is used when geofencing indicates that the home is unoccupied.

FIG. 8 also shows a geofencing record 144. As can be seen, the geofencing record 144, which is based at least in part on the location services of the users' mobile devices, indicates that someone is home until about 9:00 AM, that everyone was AWAY from about 9:00 AM to about 6:00 PM, and then someone was home from about 6:00 PM through the rest of the evening. A temperature setpoint record 146 demonstrates the interaction between the time-based schedule 142 and the geofencing record 144. Given the relationships between HOME, AWAKE and SLEEP temperatures, it will be appreciated that this graph indicates a heating schedule.

From 6:00 AM to 7:00 AM, region 146a of the temperature setpoint record 146 indicates that the HVAC controller controls the HVAC system in accordance with the SLEEP temperature setpoint 142b of the time-based schedule 142, since this time falls within the SLEEP time period and the geofencing record 144 indicates that the home is occupied. From 7:00 AM to 9:00 AM, region 146b of the temperature setpoint record 146 indicates that the HVAC controller controls the HVAC system in accordance with the HOME temperature setpoint 142a of the time-based schedule 142, since this time falls within the HOME time period and the geofencing record 144 indicates that the home is still occupied. At 9:00 AM, the geofencing record 144 indicates that the home becomes unoccupied. In response, and as seen in region 146c of the temperature setpoint record 146, the temperature drops to an AWAY temperature setpoint that, as indicated, may be lower (e.g. more energy efficient) than both the SLEEP temperature setpoint and the HOME temperature setpoint. At about 6:00 PM, the geofencing record 144 indicates that the home becomes occupied. In response, and as seen in region 146*d* of the temperature setpoint record 146, The temperature reverts to the HOME temperature until 9:00 PM, since this time falls within the HOME time period of the time-based schedule 142 and the geofencing record 144 indicates that the home is again occupied. At 9:00 PM, the geofencing record 144 still indicates that the home is occupied, and thus the temperature drops to the SLEEP temperature setpoint of the time-based schedule 142. As shown in FIG. 8, the SLEEP temperature setpoint may be intermediate between the HOME and AWAY temperature setpoints, as seen at region 146*e* of the temperature setpoint record 146.

Figure 9:
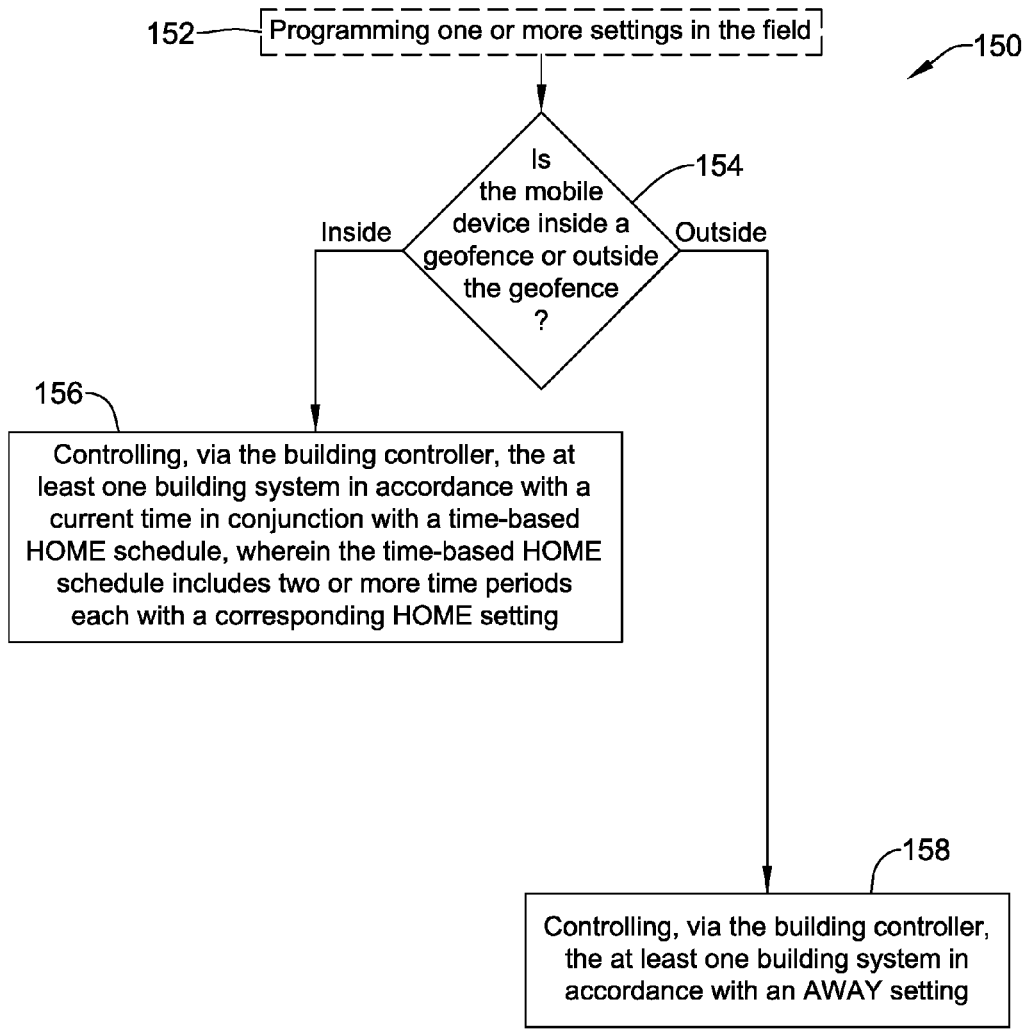
FIG. 9 is a flow diagram showing an illustrative method of operating a building controller in combination with a mobile device having location services.
Figure 10:
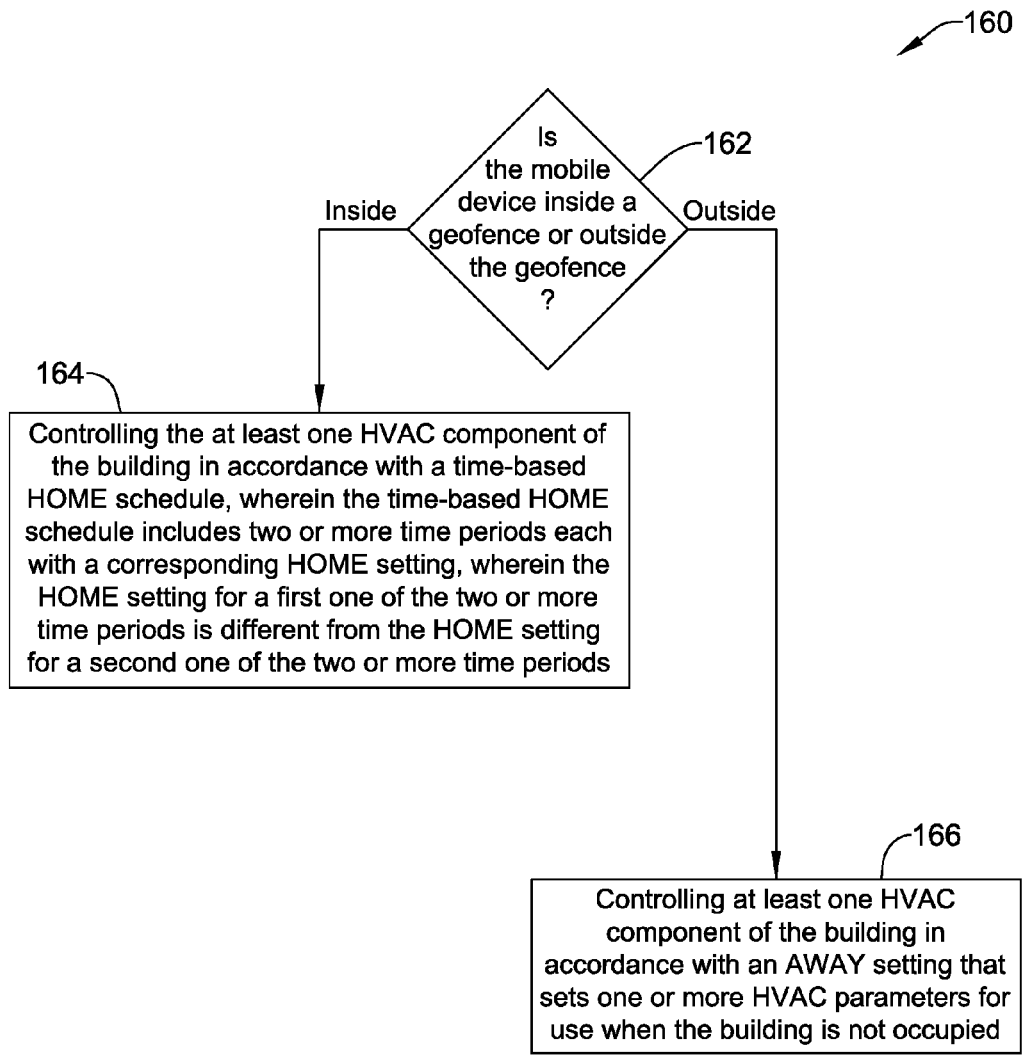
FIG. 10 is a flow diagram showing an illustrative method of operating an HVAC controller in combination with a mobile device having location services.
Figure 11:
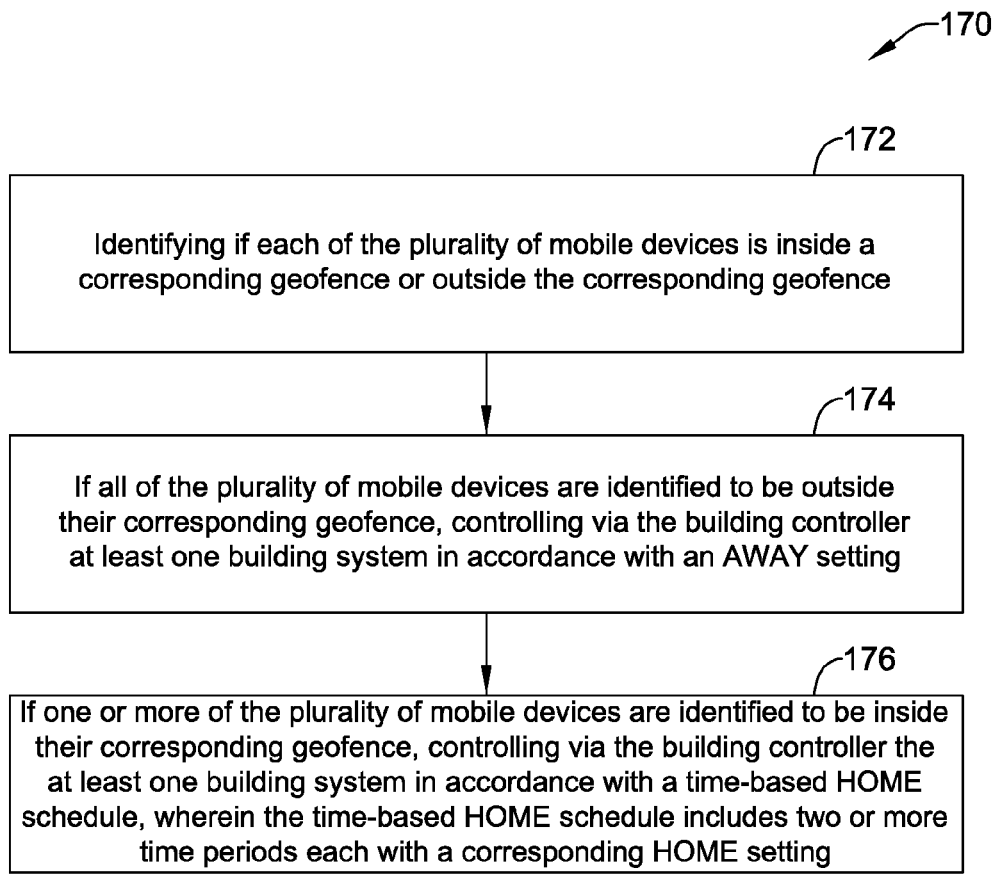
FIG. 11 is a flow diagram showing an illustrative method of operating a building controller in combination with a plurality of mobile devices each having location services.

FIGS. 9 through 11 are flow diagrams showing illustrative methods of operating a building controller. In some cases, the building controller controls at least one building system such as a security system, a lighting system and/or an HVAC system. In some cases, the building controller may be an HVAC controller such as the HVAC controller 90 (FIG. 4) and/or the HVAC controller 100 (FIG. 5). It will be appreciated that at least some of the steps illustrated may be carried out at least in part by an HVAC controller such as the HVAC controller 90 (or the HVAC controller 100). In some cases, at least some of the steps illustrated may be carried out at least in part by a server such as the server 132 and/or the remote server 66. In some cases, at least some of the steps illustrated may be carried out by a mobile device such as the mobile device 120 operating an appropriate application.

In FIG. 9, a method 150 includes an optional block 152 at which one or more settings may be programmed in the field. In some cases, this includes programming one or more settings via the user interface 122 of the mobile device 120. In some cases, this includes programming one or more settings via the user interface 94 of the HVAC controller 90 (or via the touch screen display 102 of the HVAC controller 100). Illustrative but non-limiting examples of such settings include programming a time-based HOME schedule, which may include programming a HOME setting for each of the two or more periods (e.g. HOME, SLEEP) of the time-based HOME schedule. Another example includes programming one or more geofence settings, such as a geofence radius and one or more AWAY settings.

At decision block 154, a determination is made as whether the mobile device is inside a geofence or is outside the geofence. In some instances, this determination may be made by a controller within the mobile device or within a remote server, for example. In some cases, the determination may be made by a remote server based on an indication of a geofence crossing received from a mobile device. In some cases, the determination may be made by the mobile device and communicated to a server. In some cases, the server may operatively communicate to a building controller whether the mobile device is identified to be inside the geofence or outside the geofence. In some instances, the server may instruct the building controller to control the at least one building system in accordance with a particular setpoint.

If it is determined that the mobile device is outside the geofence, control is passed to block 158, wherein the at least one building system may be controlled via the building controller in accordance with an AWAY setting, such as an AWAY setpoint. If it is determined that the mobile device is inside the geofence, control is passed to block 156, wherein the at least one building system may be controlled via the building controller in accordance with a current time in conjunction with a time-based schedule. The time-based schedule may include two or more time periods (e.g. HOME, SLEEP) each with a corresponding HOME setting, and wherein when the current time is in one of the two or more time periods of the time-based HOME schedule, the building controller may control the at least one building system in accordance with the corresponding HOME setting.

In some cases, the AWAY setting may include a temperature setpoint that represents an energy-savings temperature setting. In some cases, the HOME setting of a first one of the two or more time periods may include a temperature setpoint that represents a first comfort temperature setting, and the HOME setting of a second one of the two or more time periods may include a temperature setpoint that represents a second comfort temperature setting that is different from the first comfort temperature setting. In some cases, the first one of the two or more time periods may correspond to a portion of a day when the user of the mobile device is expected to be awake, and the second one of the two or more time periods may correspond to a portion of a day when the user of the mobile device is expected to be asleep.

In FIG. 10, a method 160 of operating an HVAC controller that is configured to control one or more HVAC components of a building in combination with a mobile device that has location services includes identifying if the mobile device is inside a geofence or outside the geofence, as generally indicated at decision block 162. If the mobile device is identified to be inside the geofence, control is passed to block 164, where the at least one HVAC component of the building may be controlled in accordance with a time-based HOME schedule. The time-based HOME schedule may include two or more time periods each with a corresponding HOME setting, wherein the HOME setting for a first one of the two or more time periods is different from the HOME setting for a second one of the two or more time periods. If the mobile device is identified to be outside the geofence, control is passed to block 166, wherein at least one HVAC component of the building may be controlled in accordance with an AWAY setting that sets one or more HVAC parameters for use when the building is not occupied.

In FIG. 11, a method 170 of operating a building controller that is configured to control one or more building systems in combination with a plurality of mobile devices that each have location services includes identifying if each of the plurality of mobile devices is inside a corresponding geofence or outside the corresponding geofence, as generally indicated at block 172. In some cases, each of the plurality of mobile devices have the same corresponding geofence about a home. In some cases, and if all of the plurality of mobile devices are identified to be outside their corresponding geofence about the home, the building controller may control at least one building system in accordance with an AWAY setting, as seen at block 174. In some cases, and if one or more of the plurality of mobile devices are identified to be inside their corresponding geofence, the building controller may control the at least one building system in accordance with a time-based HOME schedule. The time-based HOME schedule may include two or more time periods (e.g. HOME, SLEEP) each with a corresponding HOME setting, as indicated at block 176. In some cases, a first one of the two or more time periods may correspond to a portion of a day when at least some of the users of the plurality of mobile devices are expected to be awake, and a second one of the two or more time periods may correspond to a portion of the day when all of the users of the plurality of mobile devices are expected to be asleep.

Figure 12A:
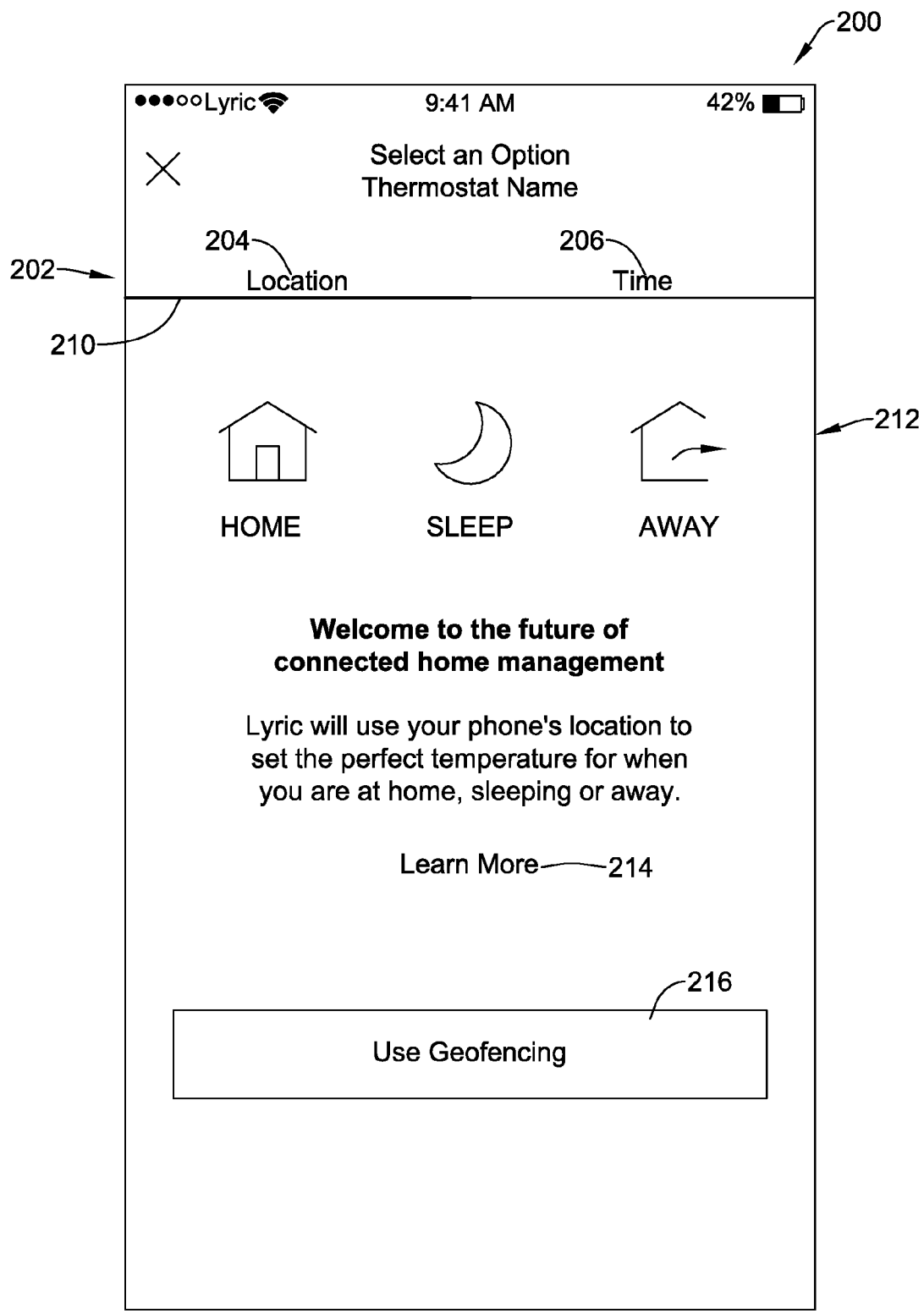
FIGS. 12A through 12G provide illustrative but non-limiting screenshots of operating an HVAC controller in combination with a mobile device having location services.

FIGS. 12A through 12G provide illustrative but non-limiting examples of screens that may be displayed on the mobile device 120 (FIG. 6) and/or on a screen of the HVAC controller 90 (or 100) pertaining to combining functionality of a time-based schedule with geofencing. FIG. 12A shows a screen 200 that may be displayed when a user is configuring their HVAC controller. The illustrative screen 200 includes a navigation bar 202 that has, as shown, a Location tab 204 and a Time tab 206. While not illustrated, in some cases the navigation bar 202 may include additional tabs. As can be seen, the Location tab 204 has been selected, as indicated by an indicator bar 210 disposed adjacent the Location tab 204. In some cases, the indicator bar 210 may instead be manifested by bolding the Location tab 204, or having the Location tab 204 flash, or blink, or appear in a different color. As can be seen, the screen 200 includes an information section 212 that informs the user of some features and functions of geofencing. A LEARN MORE button 214, if selected, may enable the user to learn more about geofencing. A USE GEOFENCING button 216, if selected, selects geofencing as the desired control option, and proceeds to one or more additional screens that enable the user to make geofencing-related setting choices.

Figure 12B:
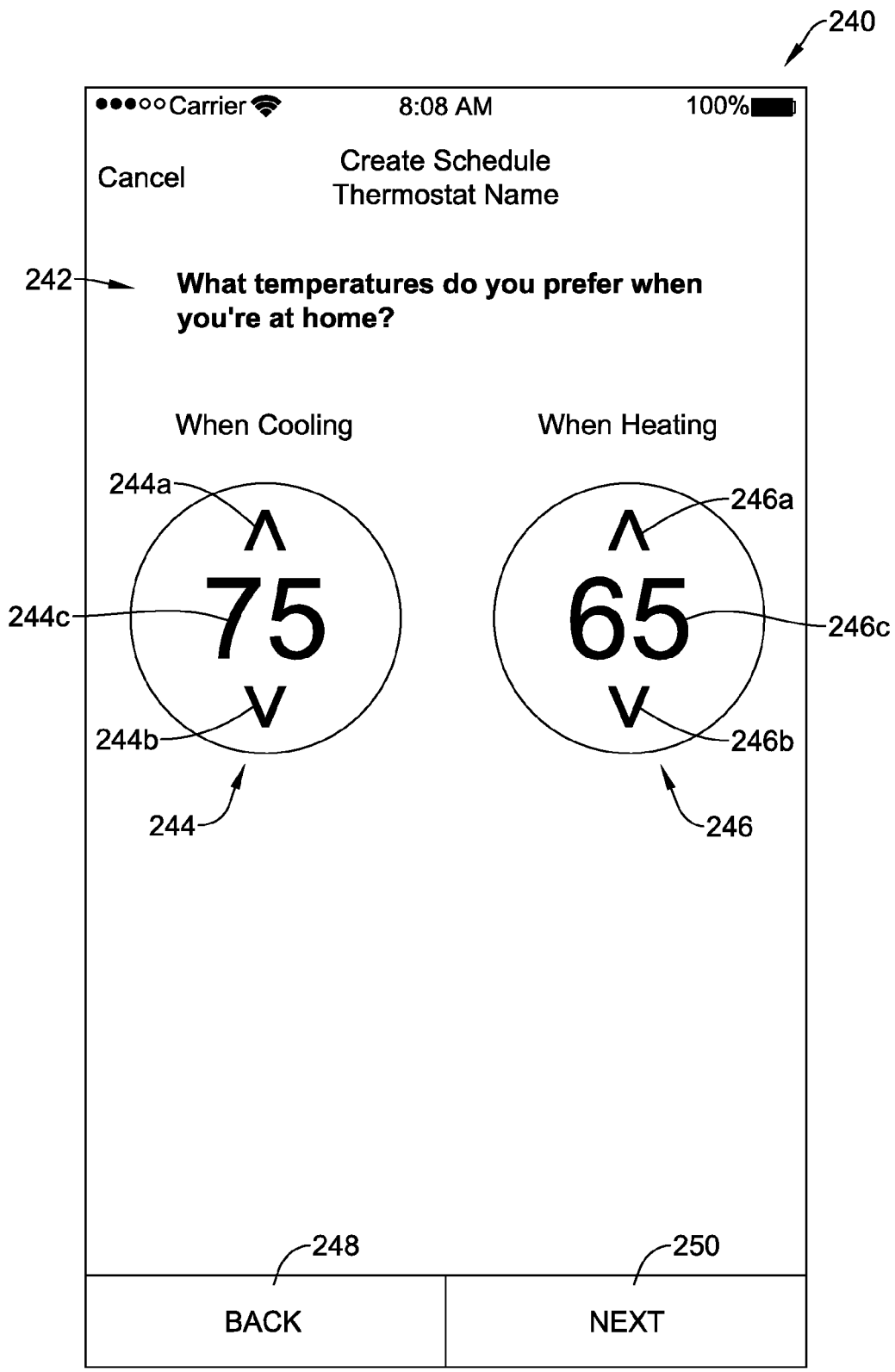
Figure 12C:
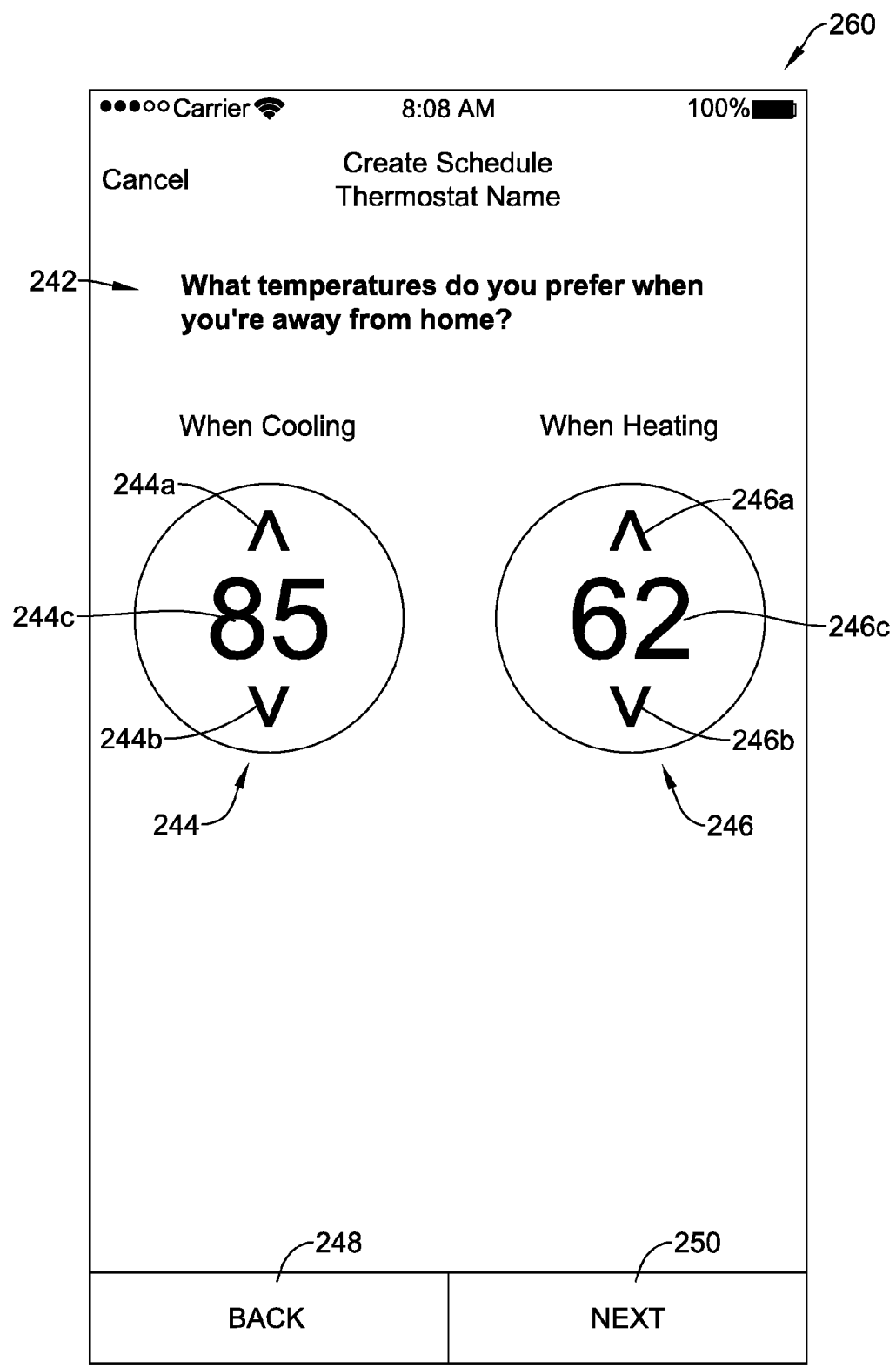

FIG. 12B shows a screen 240 that enables a user to set HOME temperature setpoints for when geofencing indicates that the home is occupied, as indicated by a query 242. An icon 244 includes an up arrow 244a and a down arrow 244b that may be used as desired to increase or decrease a cooling temperature setpoint 244c. An icon 246 includes an up arrow 246a and a down arrow 246b that may be used as desired to increase or decrease a heating temperature setpoint 246c. A BACK button 248 and a NEXT button 250 may be used to navigate linearly between screens. In this example, selecting the NEXT button 250 causes a screen 260 of FIG. 12C to be displayed. The screen 260 of FIG. 12C enables the user to select AWAY heating and cooling temperature setpoints for when geofencing indicates that the home is unoccupied, as indicated by the query 242.

Figure 12D:
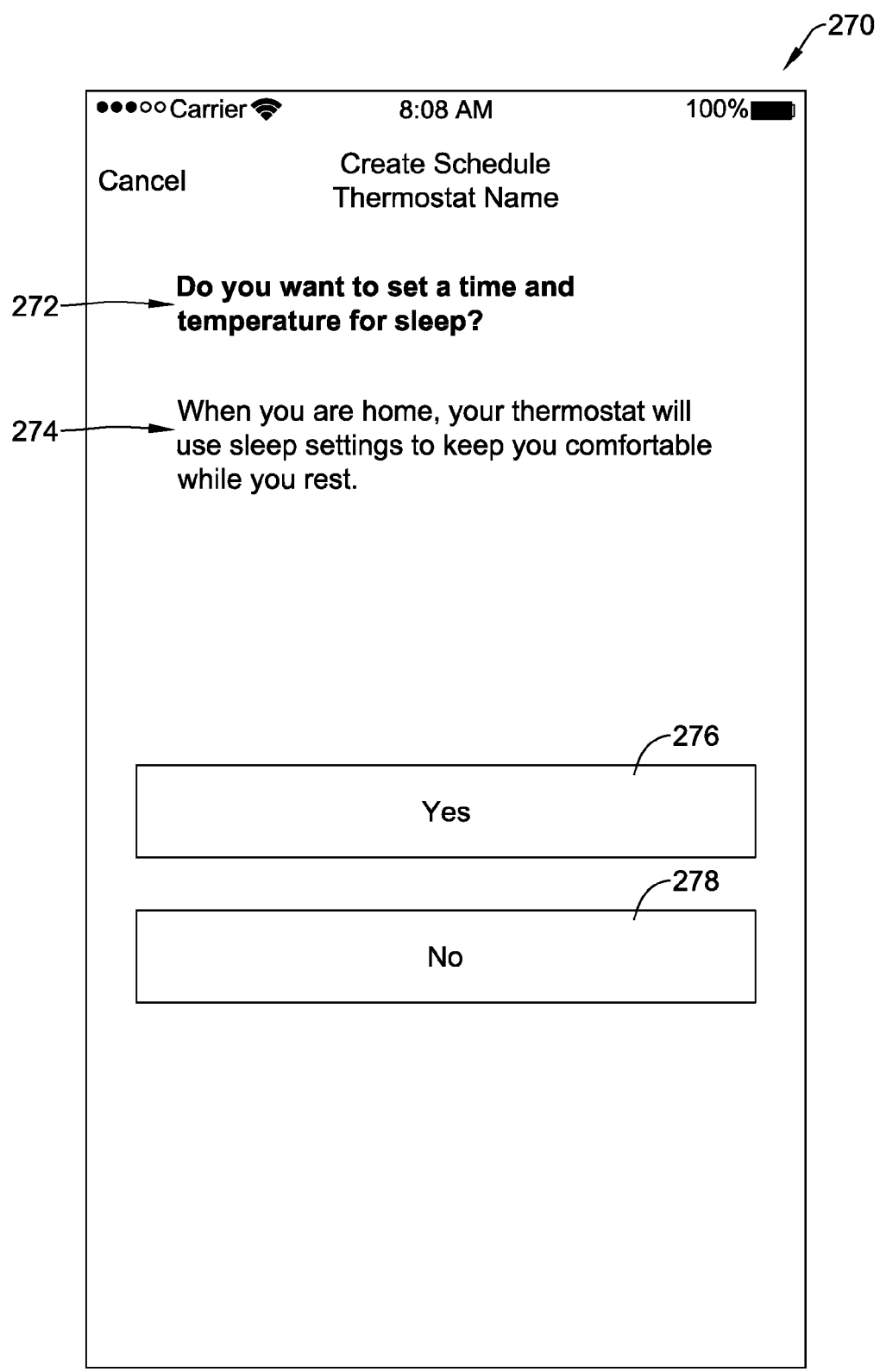

Pressing the NEXT button 250 on the screen 260 may cause a screen 270 of FIG. 12D to be displayed. The screen 260 includes an inquiry 272 that asks the user if they want to setup a time based schedule to be used in conjunction with geofencing. An infographic 274 informs the user that they can have their thermostat operate in accordance with a comfortable temperature for sleeping, when geofencing indicates that the home is occupied. The screen 260 includes a YES button 276 that may be selected to set up a SLEEP time and temperature, and a NO button 278 that the user may select if they choose not to set up a SLEEP time and temperature. Selecting the YES button 276 may cause a screen 280, as seen in FIG. 12E, to be displayed.

Figure 12E:
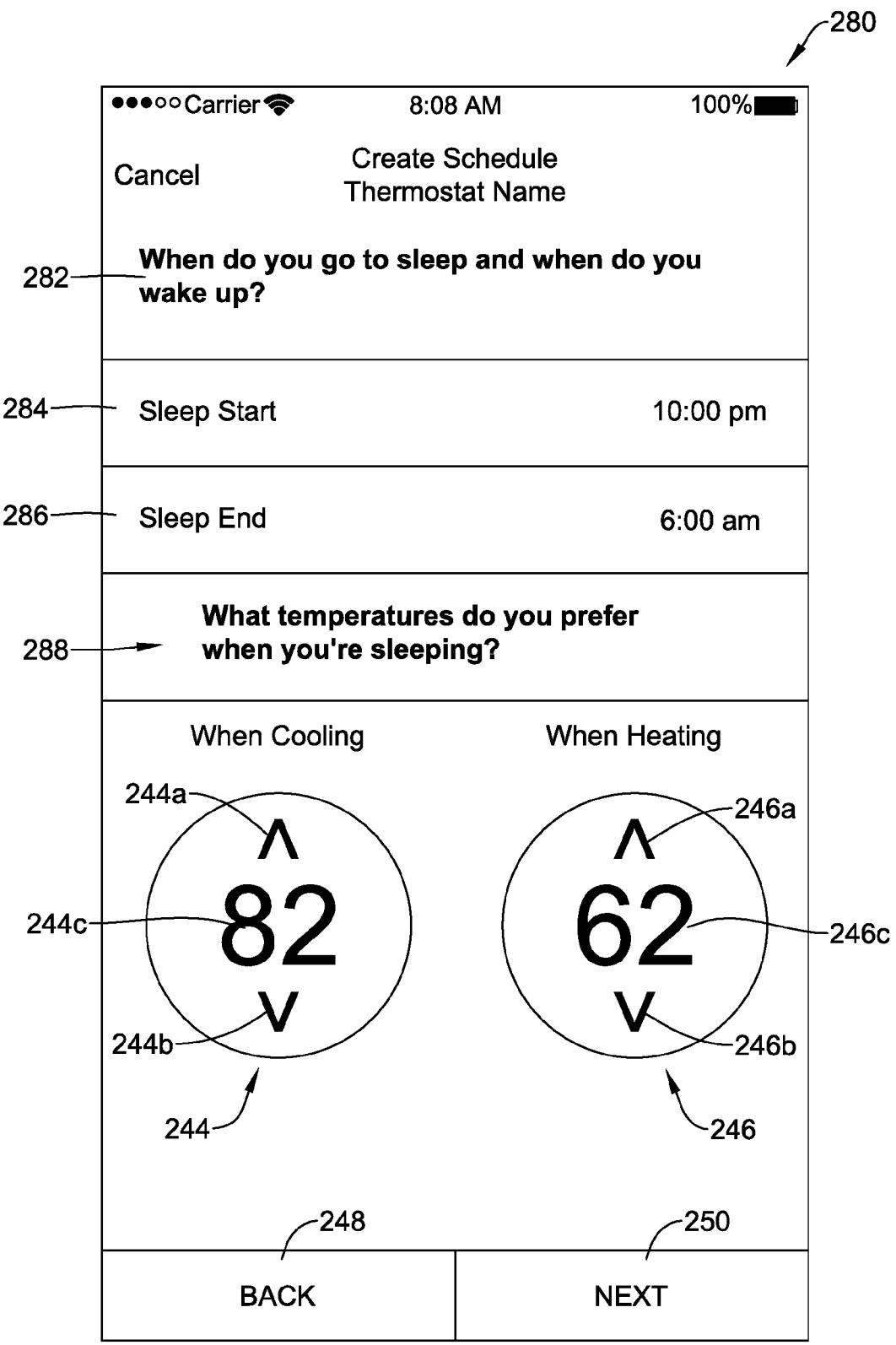

In FIG. 12E, the screen 280 includes an inquiry 282 asking the user to indicate what time they typically go to sleep and what time they typically wake up. A sleep start bar 284 displays a starting time for SLEEP, and the user may be able to modify the starting time by selecting the sleep start bar 284 and then adjusting the start time accordingly. A sleep end bar 286 displays an ending time for SLEEP, and the user may be able to modify the ending time by selecting the sleep end bar 286 and then adjusting the ending time accordingly. An inquiry 288 asks the user to indicate their desired sleeping temperature setpoints. An icon 244 includes an up arrow 244a and a down arrow 244b that may be used as desired to increase or decrease a cooling temperature setpoint 244c. An icon 246 includes an up arrow 246a and a down arrow 246b that may be used as desired to increase or decrease a heating temperature setpoint 246c. The BACK button 248 may be used to return to a previous screen. The NEXT button 250, if selected, may cause a screen 290, as seen in FIG. 12F, to be displayed.

Figure 12F:
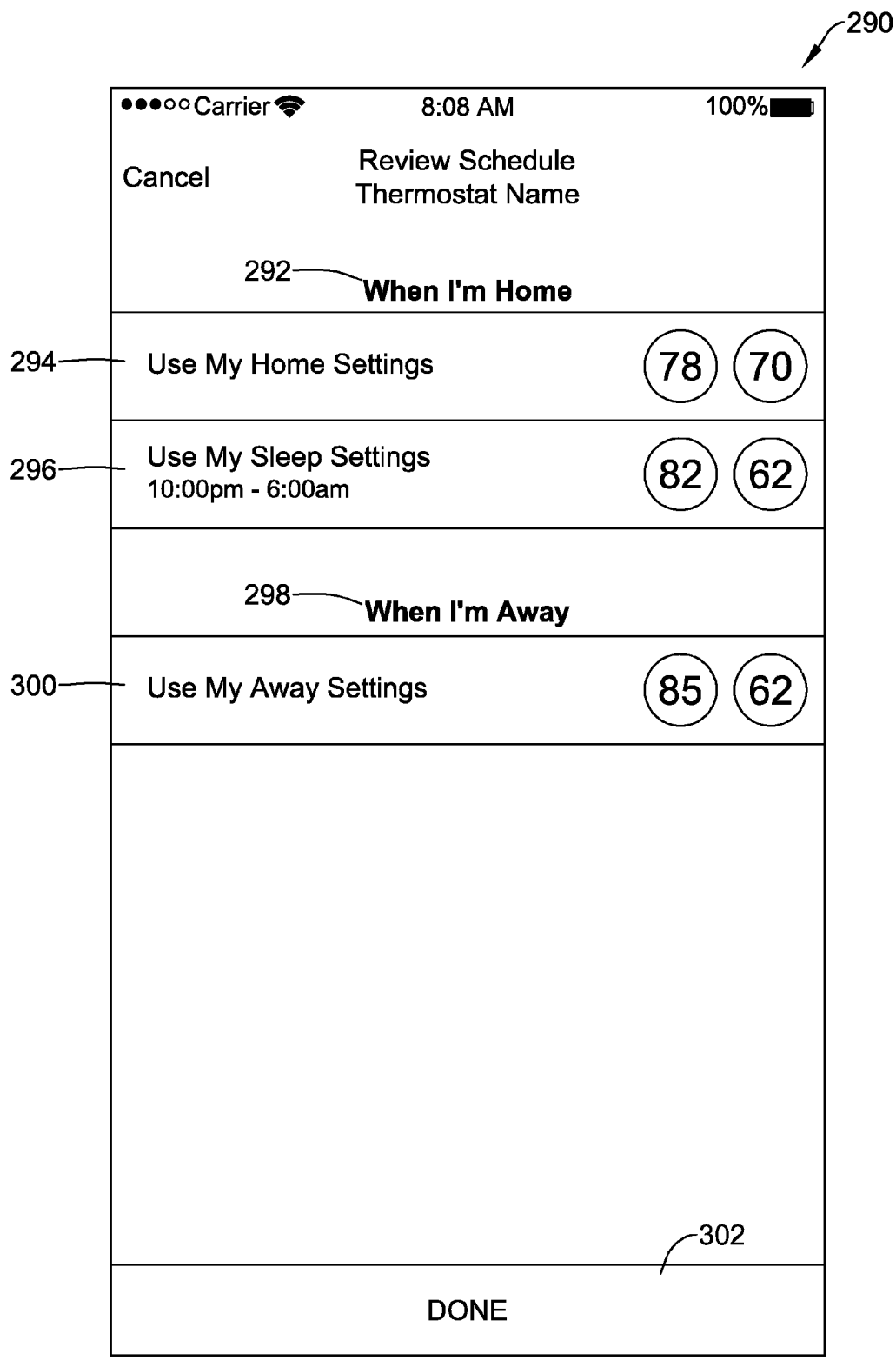

In FIG. 12F, the screen 290 permits the user to review their settings for when they are home and when they are away. In particular, a WHEN I'M HOME header 292 introduces a home settings bar 294 that includes a heating temperature setpoint and a cooling temperature setpoint to use when geofencing indicates that the home is occupied and the current time is outside of the SLEEP period. A sleep settings bar 296 shows the starting and ending times for the SLEEP period as well as the heating and cooling temperature setpoints to use when geofencing indicates that the home is occupied and the current time is within the SLEEP period. A WHEN I'M AWAY header 298 introduces an away settings bar 300 that includes a heating temperature setpoint and a cooling temperature setpoint to use when geofencing indicates that the home is not occupied, regardless of time of day. A DONE button 302 enables the user to exit and return to a previous menu.

Figure 12G:
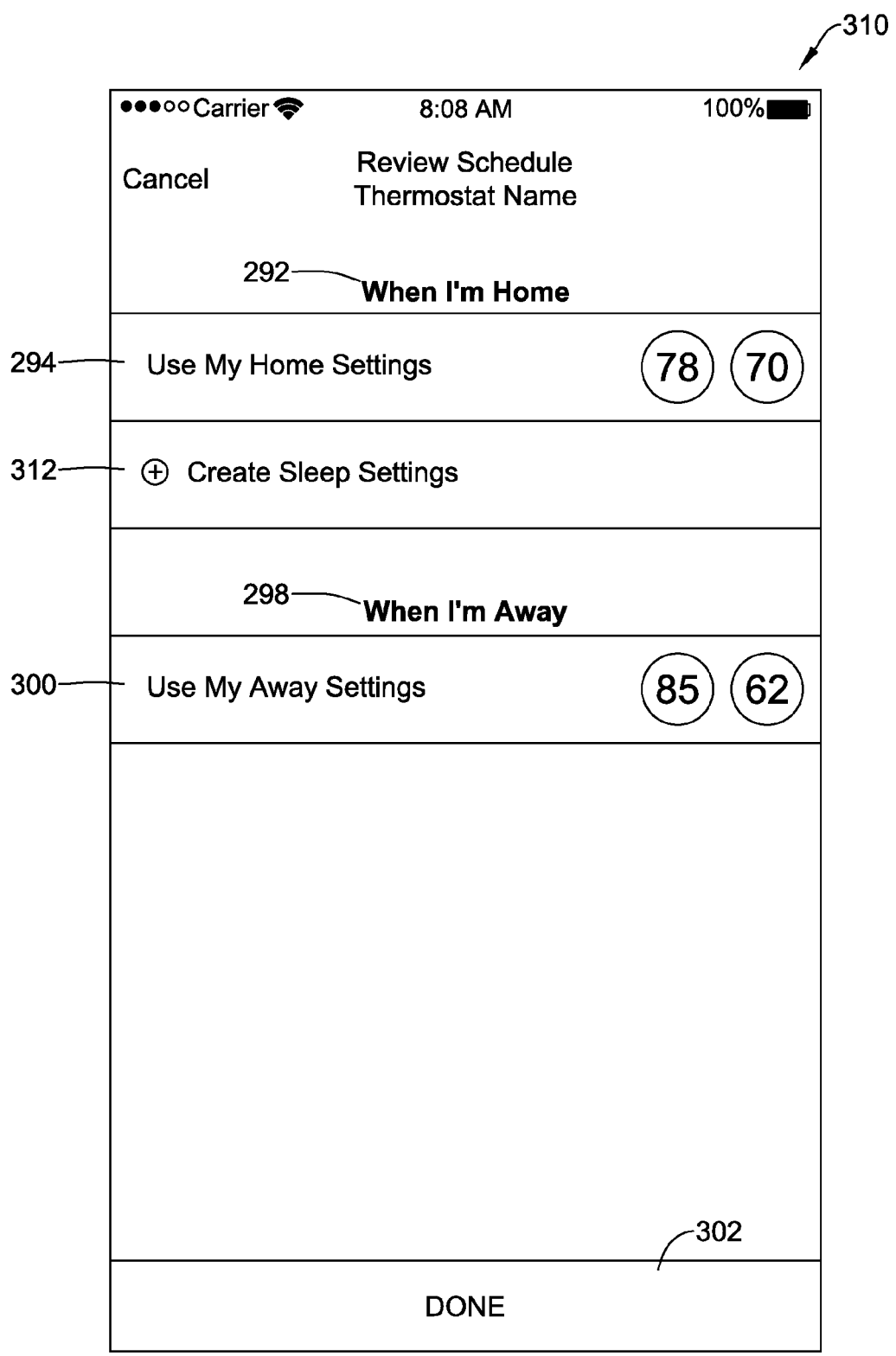

Returning briefly to FIG. 12D, if the user selects the NO button 278, a screen 310 may be displayed, as seen in FIG. 12G. In FIG. 12G, the screen 310 permits the user to review their settings for when they are home and when they are away. In particular, the WHEN I'M HOME header 292 introduces the home settings bar 294 that includes a heating temperature setpoint and a cooling temperature setpoint to use when geofencing indicates that the home is occupied. The WHEN I'M AWAY header 298 introduces the away settings bar 300 that includes a heating temperature setpoint and a cooling temperature setpoint to use when geofencing indicates that the home is not occupied. A DONE button 302 enables the user to exit and return to a previous menu. In some cases, as illustrated, the screen 310 may include a CREATE SLEEP SETTINGS icon 312 that, if selected, may cause the screen 240 (FIG. 12B) to be displayed.

It should be understood that this disclosure is, in many respects, only illustrative. Changes may be made in details, particularly in matters of shape, size, and arrangement of steps without exceeding the scope of the disclosure. This may include, to the extent that it is appropriate, the use of any of the features of one example embodiment being used in other embodiments.

What is claimed is:

1. A method of operating a building controller that is configured to control one or more building systems in combination with a smartphone that has location services and a user interface, the method comprising:
storing a time-based HOME schedule including two or more time periods, the two or more time periods including at least a first time period with a first HOME setting and a second time period with a second HOME setting;
identifying via the building controller whether the smartphone is inside a geofence or outside the geofence;
in response to identifying that the smartphone is outside the geofence, controlling via the building controller at least one building system in accordance with an AWAY setting that over-rides at least part of the time-based HOME schedule; and
in response to identifying that the smartphone is inside the geofence, controlling via the building controller the at least one building system in accordance with a current time in conjunction with the time-based HOME schedule, wherein controlling the at least one building system in accordance with the current time in conjunction with the time-based HOME schedule comprises:

controlling the at least one building system with the first HOME setting when the current time is in the first time period and in response to identifying that the smartphone is inside the geofence; and controlling the at least one building system with the second HOME setting when the current time is in the second time period and in response to identifying that the smartphone is inside the geofence.

2. The method of claim 1, further comprising programming the two or more time periods of the time-based HOME schedule via one or more screens that are displayed on the user interface of the smartphone.

3. The method of claim 1, further comprising programming the HOME setting for each of the two or more time periods of the time-based HOME schedule via one or more screens that are displayed on the user interface of the smartphone.

4. The method of claim 1, further comprising programming the AWAY setting via one or more screens that are displayed on the user interface of the smartphone.

5. The method of claim 1, further comprising programming the geofence via one or more screens that are displayed on the user interface of the smartphone.

6. The method of claim 1, wherein identifying whether the smartphone is inside the geofence or outside the geofence is based on an indication of a geofence crossing received from the smartphone.

7. The method of claim 1, wherein identifying whether the smartphone is inside the geofence or outside the geofence is determined by the smartphone and communicated to a server.

8. The method of claim 7, further comprising:
receiving, by the building controller from the server, an indication of whether the smartphone is identified to be inside the geofence or outside the geofence.

9. The method of claim 7, further comprising:
controlling the at least one building system in accordance with the AWAY setting in response to receiving, by the building controller from the server, an indication that the smartphone is outside the geofence by the server; and
controlling the at least one building system in accordance with the current time in conjunction with the time-based HOME schedule in response to receiving, by the building controller from the server, an indication that the smartphone is inside the geofence by the server.

10. The method of claim 1, wherein the at least one building system comprises a security system, a lighting system, and/or an HVAC system.

11. The method of claim 1, wherein:
the AWAY setting comprises a temperature setpoint that represents an energy-savings temperature setting;
the first HOME setting of the first time period comprises a temperature setpoint that represents a first comfort temperature setting; and
the second HOME setting of the second time period comprises a temperature setpoint that represents a second comfort temperature setting that is different from the first comfort temperature setting.

12. The method of claim 11, wherein the first time period corresponds to a portion of a day in which the user of the smartphone is expected to be awake.

13. The method of claim 12, wherein the second time period corresponds to a portion of a day in which the user of the smartphone is expected to be asleep.

14. A method of operating an HVAC controller that is configured to control one or more HVAC components of a building in combination with a smartphone that has location services, the HVAC controller utilizing an AWAY setting and a time-based HOME schedule in controlling the one or more HVAC components of the building, the method comprising:
identifying via the HVAC controller whether the smartphone is inside a geofence or outside the geofence;
in response to identifying that the smartphone is outside the geofence, controlling via the HVAC controller at least one HVAC component of the building in accordance with the AWAY setting that over-rides at least part of the time-based HOME schedule by setting one or more HVAC parameters for use when the building is not occupied; and
in response to identifying via the HVAC controller that the smartphone is inside the geofence, controlling via the HVAC controller the at least one HVAC component of the building in accordance with the time-based HOME schedule,
wherein the time-based HOME schedule includes two or more time periods, the two or more time periods including at least a first time period with a first HOME setting for when the smartphone is identified to be inside the geofence and a second time period with a second HOME setting for when the smartphone is identified to be inside the geofence,
wherein the first HOME setting for the first time period is different from the second HOME setting for the second time period.

15. The method of claim 14, wherein:
the AWAY setting comprises a temperature setpoint that represents an energy-savings temperature setting;
the first HOME setting of the first time period comprises a temperature setpoint that represents a comfort temperature setting when the user is awake; and
the second HOME setting of the second time period comprises a temperature setpoint that represents a comfort temperature setting when the user is asleep.

16. A method of operating a building controller that is configured to control one or more building systems in combination with a plurality of smartphones that each have location services, the method comprising:
identifying via the building controller whether each of the plurality of smartphones is inside a corresponding geofence or outside the corresponding geofence;
in response to identifying via the building controller that one or more of the plurality of smartphones are inside their corresponding geofence, controlling via the building controller the at least one building system in accordance with a time-based HOME schedule, wherein the time-based HOME schedule includes two or more time periods, the two or more time periods including at least a first time period with a first HOME setting and a second time period with a second HOME setting, wherein controlling the at least one building system in accordance with the time-based HOME schedule comprises:
controlling the at least one building system with the first HOME setting when a current time is in the first time period and in response to identifying that the one or more of the plurality of smartphones are inside their corresponding geofence; and
controlling the at least one building system with the second HOME setting when the current time is in the second time period and in response to identifying that the one or more of the plurality of smartphones are inside their corresponding geofence; and when all of the plurality of smartphones are identified to be outside their corresponding geofence, controlling via the building controller at least one of the one or more building systems in accordance with an AWAY setting that over-rides at least part of the time-based HOME schedule.

17. The method of claim 16, wherein the plurality of smartphones have the same corresponding geofence.

18. The method of claim 16, wherein:
the AWAY setting comprises a temperature setpoint that represents an energy-savings temperature setting;
the first HOME setting of the first time period comprises a temperature setpoint that represents a comfort temperature setting when the users are awake; and
the second HOME setting of the second time period comprises a temperature setpoint that represents a second comfort temperature setting when the users are asleep.

19. The method of claim 18, wherein the first time period of the two or more time periods corresponds to a portion of a day in which at least some of the users of the plurality of smartphones are expected to be awake, and the second time period of the two or more time periods corresponds to a portion of the day in which all of the users of the plurality of smartphones are expected to be asleep.

\* \* \* \* \*